(12) United States Patent
Batchu et al.

(10) Patent No.: US 8,874,164 B2
(45) Date of Patent: Oct. 28, 2014

(54) POWER CONSUMPTION IMPROVEMENT FOR CERTAIN M2M DEVICES

(71) Applicant: Qualcomm Incorporated, San Diego, CA (US)

(72) Inventors: Bhaskara V. Batchu, Ameenpur Village (IN); Sharad Shahi, Bikaner (IN)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 13/670,574

(22) Filed: Nov. 7, 2012

(65) Prior Publication Data

US 2014/0128062 A1 May 8, 2014

(51) Int. Cl.
*H04W 88/02* (2009.01)
*H04W 60/00* (2009.01)

(52) U.S. Cl.
CPC ............. *H04W 60/00* (2013.01); *Y02B 60/50* (2013.01)
USPC ...................................................... 455/556.1

(58) Field of Classification Search
USPC ............... 455/435.1, 68, 556.1; 370/352; 709/204; 707/758
See application file for complete search history.

(56) References Cited

U.S. PATENT DOCUMENTS

| | | | |
|---|---|---|---|
| 6,108,542 A | 8/2000 | Swanchara et al. | |
| 7,725,107 B2 | 5/2010 | Sharma | |
| 8,085,708 B2 | 12/2011 | Bengtsson et al. | |
| 2007/0105557 A1* | 5/2007 | Israelsson et al. | 455/436 |
| 2013/0288678 A1* | 10/2013 | Lott et al. | 455/435.1 |
| 2013/0308632 A1* | 11/2013 | Keller et al. | 370/352 |

OTHER PUBLICATIONS

3GPP TR 22.868 V8.0.0 (Mar. 2007), 3rd Generation Partnership Project; Technical Specification Group Services and System Aspects; Study on Facilitating Machine to Machine Communication in 3GPP Systems; (Release 8).
3GPP2 cdma2000 TSG-C, C30-20080616-012, "Enabling Machine-to-machine communications in HRPD networks," 2008.
3GPP2 S.R0141-0, Version 1.0, Study for Machine-to-Machine (M2M) Communication for cdma2000 Networks, Dec. 9, 2010.
Hodes, et al., "Composable ad hoc location-based services for heterogeneous mobile clients," Wireless Networks 5 (1999) pp. 411-427.
Klan, et al., "Developing and Deploying Sensor Network Applications with AnduIN," DMSN '09, Aug. 24, 2009, Lyon, France, 6 pages.

* cited by examiner

*Primary Examiner* — Diane Mizrahi
(74) *Attorney, Agent, or Firm* — Linda G. Gunderson

(57) ABSTRACT

Performance is improved in certain M2M devices by suppressing explicit network registration or attachment. The described techniques may be used, for example, by M2M devices that periodically or occasionally transmit event data using wireless communication networks without needing to receive periodic or on-demand communications from the network for regular operation. In some embodiments, an M2M device may continue to monitor pilot channels of available wireless networks, select a particular network for communication from among the available wireless networks, and monitor system information for the selected network without registering on the selected network. The M2M device may suppress explicit registration based on one or more explicit registration triggers associated with the selected network. The M2M device may be implicitly registered as part of the network access transmitting the captured or measured event data to the selected network. Other aspects, embodiments, and features are also claimed and described.

40 Claims, 14 Drawing Sheets

POWER CONSUMPTION IMPROVEMENT FOR CERTAIN M2M DEVICES

TECHNICAL FIELD

Embodiments of the present invention relate generally to wireless communication, and more particularly, to power consumption improvement for wireless communication devices, such as machine-to-machine (M2M) devices.

BACKGROUND

Machine-to-Machine (M2M) communication or Machine Type Communication (MTC) are terms that may be used to refer to data communication technologies that allow automated devices to communicate with one another without human intervention. For example, M2M and/or MTC may refer to communications from devices that integrate sensors or meters to measure or capture information, and relay that information to a central server or application. A device used in this context may be referred to as an M2M device, MTC device, and/or an MTC user equipment (UE).

M2M devices may be used in a number of different applications to, for example, collect information or enable automated behavior of machines. Examples of applications for M2M devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. The market for M2M devices is expected to grow rapidly as industries such as automotive, security, healthcare, and fleet management employ M2M to increase productivity, manage costs, and/or expand customer services. For example, it is estimated that the M2M connectivity market may grow to over 200 million devices employed in the field by 2014.

M2M devices may use a variety of wired and/or wireless communication technologies. For example, M2M devices may communicate with a network over various wireless cellular technologies and/or various wireless networking technologies (e.g., IEEE 802.11 (Wi-Fi), IEEE 802.16 (WiMAX), etc.). M2M devices may also communicate with one another using various peer-to-peer technologies such as Bluetooth, ZigBee, and/or other ad-hoc or mesh network technologies. The expansion of multiple access wireless networks around the world has made it far easier for M2M communication to take place and has lessened the amount of power and time necessary for information to be communicated between machines. These networks also allow an array of new possibilities and business opportunities related to measuring and tracking environmental characteristics, operational parameters, and/or use factors.

Some applications for M2M devices may depend on battery power for collecting, transmitting, and/or receiving data. For these devices, reducing power consumption of the device prolongs the time that the device can operate in the field without battery replacement. Widespread adoption of M2M devices may also pose challenges for wireless cellular networks that are significantly different from traditional wireless communications involving human to human (H2H) communications. These challenges may arise because the volume of M2M devices registering and accessing on the network may be much larger than the number of H2H devices supported by the network. For example, the network may allocate IP addresses, bearer IDs, and the like to mobile devices registered on the network. Several aspects related to M2M devices may also be important in efficiently using network resources. In one aspect, M2M devices may transmit only small amounts of data and may transmit infrequently. In another aspect, certain M2M devices may be locationally static, either permanently or for periods of time. Therefore, using the same registration and access procedures for M2M devices as H2H devices may burden the network more than necessary.

BRIEF SUMMARY OF SOME EMBODIMENTS

A summary of some sample embodiments are provided below. The summaries are provided for the reader's convenience, are not an extensive overview of all contemplated features of the disclosure, and are intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

The described features relate to one or more methods, systems, and devices for improving performance in certain M2M devices by suppressing explicit network registration or attachment. The described techniques may be used, for example, by M2M devices that periodically or occasionally transmit event data using wireless communication networks without needing to receive periodic or on-demand communications from the network for regular operation. In some embodiments, an M2M device may continue to monitor pilot channels of available wireless networks, select a particular network for communication from among the available wireless networks, and monitor system information for the selected network without registering on the selected network.

The system information for the selected network may include explicit registration triggers and the M2M device may suppress explicit registration based on the explicit registration triggers associated with the selected network. The system information may include access parameters for use in accessing the network. The M2M device may capture or measure information related to an event and transmit that information to the selected network as part of a network access prior to, or without performing, explicit registration on the selected network. The network access may be performed according to one or more of the access parameters. The M2M device may be implicitly registered as part of the network access transmitting the captured or measured event data to the selected network.

Some embodiments include a method for wireless communication that may be performed by a wireless communications device configured for autonomous uplink communication. The method may include identifying a first wireless network cell and transmitting a network access comprising information associated with a first event to the first wireless network cell prior to performing an explicit registration of the wireless communications device with the first wireless network cell.

The method may include identifying a second wireless network cell, determining respective channel quality information for the first wireless network cell and the second wireless network cell, selecting the second wireless network cell based on determining that a channel quality of the second wireless network cell is higher than a channel quality of the first wireless network cell, and transmitting a network access comprising information associated with a second event to the second wireless network cell prior to performing an explicit registration of the wireless communications device with the second wireless network cell. The first and second wireless network cells may be base stations or sectors of first and second wireless communications networks, respectively. The first wireless communications network may use a first radio access technology and the second wireless communications network may use a second, different, radio access technology. The wireless communications device may select the second wireless network cell even where the channel quality of the second wireless network cell, accounting for a registration penalty related to power consumption that would be incurred by registering the wireless communications device with the second wireless network cell, is lower than the channel quality of the first wireless network cell.

In some embodiments, transmitting the network access includes transmitting an origination message to the first wireless network cell, receiving a traffic channel assignment from the first wireless network cell, and transmitting the event information to the first wireless network cell via the traffic channel. The origination message may include a device identifier for the wireless communications device. The origination message may be transmitted via a reverse link access channel of the first wireless network cell.

In some embodiments, the method includes suppressing one or more explicit registration triggers associated with the first wireless network cell. In these embodiments, the method may include receiving system information from the first wireless network cell comprising an explicit registration trigger associated with the first wireless network cell, detecting a device event corresponding to the explicit registration trigger, and suppressing, responsive to detecting the device event, explicit registration to the first wireless network cell. The explicit registration trigger may be, for example, a frequency class change trigger, a time-period trigger, a movement-based trigger, a zone-based trigger, and/or a parameter change based trigger.

Some embodiments include a wireless communications device configured for autonomous uplink communication. The wireless communications device may include means for identifying a first wireless network cell and means for transmitting a network access comprising information associated with a first event to the first wireless network cell prior to performing an explicit registration of the wireless communications device with the first wireless network cell.

The wireless communications device may further include means for identifying a second wireless network cell, means for determining respective channel quality information for the first wireless network cell and the second wireless network cell, means for selecting the second wireless network cell based on determining that a channel quality of the second wireless network cell is higher than a channel quality of the first wireless network cell, and means for transmitting a network access comprising information associated with a second event to the second wireless network cell prior to performing an explicit registration of the wireless communications device with the second wireless network cell. The first and second wireless network cells may be base stations or sectors of first and second wireless communications networks, respectively. The first wireless communications network may use a first radio access technology and the second wireless communications network may use a second, different, radio access technology. The wireless communications device may select the second wireless network cell even where the channel quality of the second wireless network cell, accounting for a registration penalty related to power consumption that would be incurred by registering the wireless communications device with the second wireless network cell, is lower than the channel quality of the first wireless network cell.

In some embodiments, the means for transmitting the network access includes means for transmitting an origination message to the first wireless network cell, means for receiving a traffic channel assignment from the first wireless network cell, and means for transmitting the event information to the first wireless network cell via the traffic channel. The origination message may include a device identifier for the wireless communications device. The origination message may be transmitted via a reverse link access channel of the first wireless network cell.

In some embodiments, the wireless communications device may suppress one or more explicit registration triggers associated with the first wireless network cell. In these embodiments, the wireless communications device may include means for receiving system information from the first wireless cell comprising an explicit registration trigger associated with the first wireless network cell, means for detecting a device event corresponding to the explicit registration trigger, and means for suppressing, responsive to detecting the device event, explicit registration to the first wireless network cell. The explicit registration trigger may be, for example, a frequency class change trigger, a time-period trigger, a movement-based trigger, a zone-based trigger, and/or a parameter change based trigger.

Embodiments include a computer program product for reducing power consumption in a wireless communications device configured for autonomous uplink communication. The computer program product may include a non-transitory computer-readable medium that includes code for identifying, by the wireless communications device, a first wireless network cell and code for transmitting a network access comprising information associated with a first event to the first wireless network cell prior to performing an explicit registration of the wireless communications device with the first wireless network cell.

In embodiments, the non-transitory computer-readable medium includes code for identifying a second wireless network cell, code for determining respective channel quality information for the first wireless network cell and the second wireless network cell, code for selecting the second wireless network cell based on determining that a channel quality of the second wireless network cell is higher than a channel quality of the first wireless network cell, and code for transmitting a network access comprising information associated with a second event to the second wireless network cell prior to performing an explicit registration of the wireless communications device with the second wireless network cell. The first and second wireless network cells may be base stations or sectors of first and second wireless communications networks, respectively. The first wireless communications network may use a first radio access technology and the second wireless communications network may use a second, different, radio access technology. The wireless communications device may select the second wireless network cell even where the channel quality of the second wireless network cell, accounting for a registration penalty related to power consumption that would be incurred by registering the wireless communications device with the second wireless network cell, is lower than the channel quality of the first wireless network cell.

In some embodiments, the code for transmitting the network access may further include code for transmitting an origination message to the first wireless network cell, code for receiving a traffic channel assignment from the first wireless network cell, and code for transmitting the event information to the first wireless network cell via the traffic channel. The origination message may include a device identifier for the wireless communications device. The origination message may be transmitted via a reverse link access channel of the first wireless network cell.

In some embodiments, the computer program product may include code for suppressing one or more explicit registration triggers associated with the first wireless network cell. In these embodiments, the non-transitory computer-readable medium may include code for receiving system information from the first wireless network cell comprising an explicit registration trigger associated with the first wireless network cell, code for detecting a device event corresponding to the explicit registration trigger, and code for suppressing, responsive to detecting the device event, explicit registration to the first wireless network cell. The explicit registration trigger may be, for example, a frequency class change trigger, a time-period trigger, a movement-based trigger, a zone-based trigger, and/or a parameter change based trigger.

Some embodiments include yet another wireless communications device configured for autonomous uplink communication. The wireless communications device may include at least one processor configured to identify a first wireless network cell and transmit a network access comprising information associated with a first event to the first wireless network cell prior to performing an explicit registration of the wireless communications device with the first wireless network cell.

In some embodiments, the processor is further configured to identify a second wireless network cell, determine respective channel quality information for the first wireless network cell and the second wireless network cell, select the second wireless network cell based on determining that a channel quality of the second wireless network cell is higher than a channel quality of the first wireless network cell, and transmit a network access comprising information associated with a second event to the second wireless network cell prior to performing an explicit registration of the wireless communications device with the second wireless network cell. The first and second wireless network cells may be base stations or sectors of first and second wireless communications networks, respectively. The first wireless communications network may use a first radio access technology and the second wireless communications network may use a second, different, radio access technology. In some embodiments, the processor is configured to select the second wireless network cell even where the channel quality of the second wireless network cell, accounting for a registration penalty related to power consumption that would be incurred by registering the wireless communications device with the second wireless network cell, is lower than the channel quality of the first wireless network cell.

In some embodiments, the processor is further configured to transmit an origination message to the first wireless network cell, receive a traffic channel assignment from the first wireless network cell, and transmit the event information to the first wireless network cell via the traffic channel. The origination message may include a device identifier for the wireless communications device. The origination message may be transmitted via a reverse link access channel of the first wireless network cell.

In embodiments, the processor is configured to suppress one or more explicit registration triggers associated with the first wireless network cell. In these embodiments, the processor may be further configured to receive system information from the first wireless network cell comprising an explicit registration trigger associated with the first wireless network cell, detect a device event corresponding to the explicit registration trigger, suppress, responsive to detecting the device event, explicit registration to the first wireless network cell. The explicit registration trigger may be, for example, a frequency class change trigger, a time-period trigger, a movement-based trigger, a zone-based trigger, and/or a parameter change based trigger.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
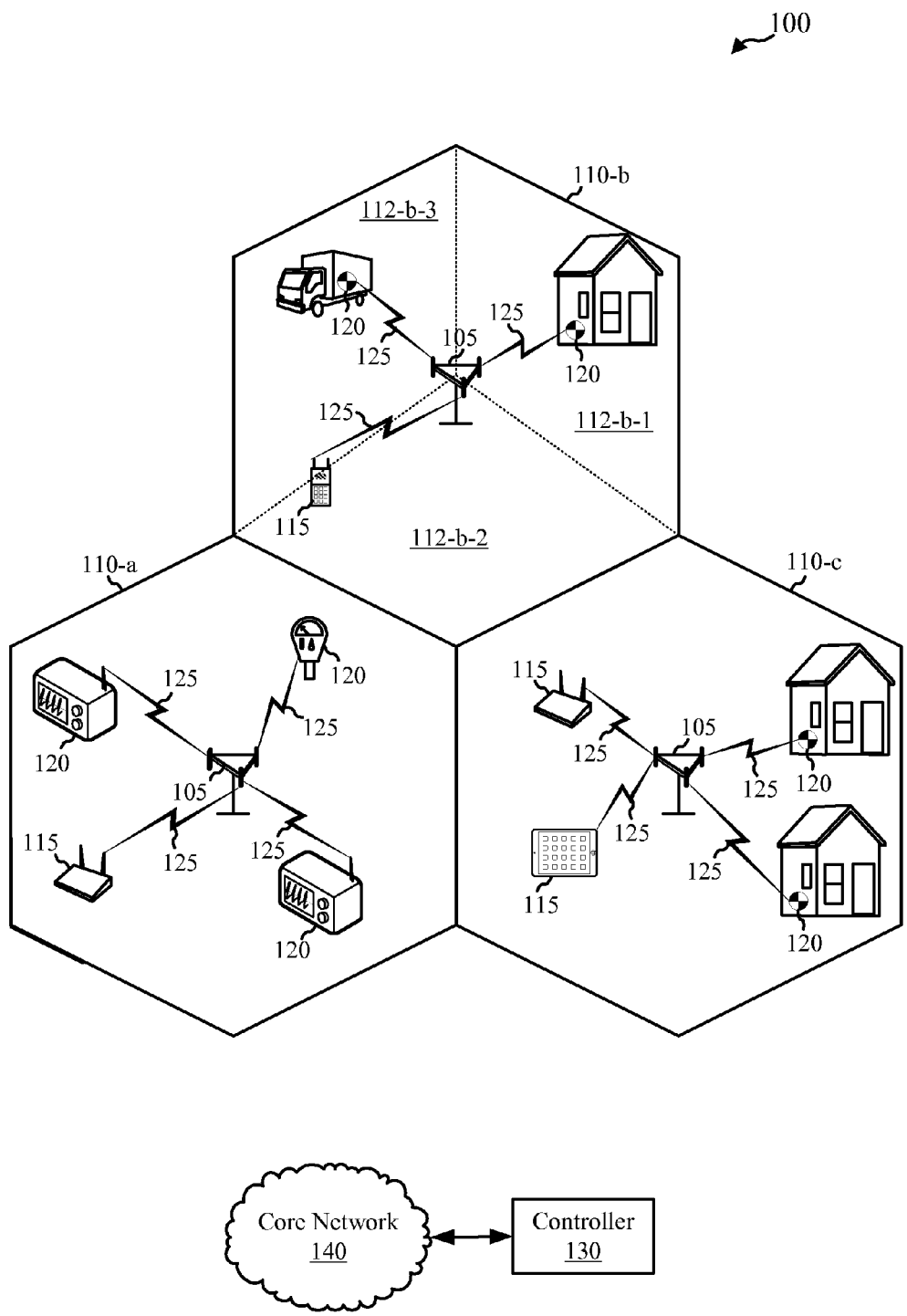
FIG. 1 shows a block diagram of a wireless communications system in accordance with various embodiments.

Methods, systems, and devices are described for improving performance in certain M2M devices by suppressing explicit network registration or attachment. The described techniques may be used, for example, by M2M devices that periodically or occasionally transmit event data using wireless communication networks without needing to receive periodic or on-demand communications from the network for regular operation. In some embodiments, an M2M device may continue to monitor pilot channels of available wireless networks, select a particular network for communication from among the available wireless networks, and monitor system information for the selected network without registering on the selected network.

The system information for the selected network may include explicit registration triggers and the M2M device may suppress explicit registration based on the explicit registration triggers associated with the selected network. The system information may include access parameters for use in accessing the network. The M2M device may capture or measure information related to an event and transmit that information to the selected network as part of a network access prior to, or without performing, explicit registration on the selected network. The network access may be performed according to one or more of the access parameters. The M2M device may be implicitly registered as part of the network access transmitting the captured or measured event data to the selected network.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies for multiple access in a wireless system such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of RATs employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of RATs employing FDMA and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100. The system 100 includes base stations 105 (or cells), mobile devices 115, a base station controller 130, and a core network 140 (the controller 130 may be integrated into the core network 140). In one example, the network controller 130 may be coupled to a set of base stations and provide coordination and control for these base stations 105. The controller 130 may communicate with the base stations 105 via a backhaul (e.g., core network 140). The base stations 105 may also communicate with one another directly or indirectly and/or via wireless or wireline backhaul. The core network 140 may include network entities such as Serving Gateway, Packet Data Serving Node, Packet Data Network Gateway, Mobility Management Entity, etc.

The system 100 may support operation on multiple carriers (waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The system 100 may include multiple RANs with overlapping or non-overlapping coverage areas.

The base stations 105 may wirelessly communicate with the mobile devices 115 via a base station antenna (not shown). The base stations 105 may communicate with the devices 115 under the control of the base station controller 130 via multiple carriers. Each of the base station 105 sites may provide communication coverage for a respective geographic area. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area for each base station 105 here is identified as 110-*a*, 110-*b*, or 110-*c*. The coverage area for a base station may be divided into sectors (e.g., 112-*b*-1, 112-*b*-2, 112-*b*-3, etc.). The system 100 may include base stations 105 of different types (e.g., macro, pico, and/or femto base stations). A macro base station may provide communication coverage for a relatively large geographic area (e.g., 35 km in radius). A pico base station may provide coverage for a relatively small geographic area (e.g., 2 km in radius), and a femto base station may provide communication coverage for a relatively smaller geographic area (e.g., 50 m in radius). There may be overlapping coverage areas for different technologies.

The devices 115 may be dispersed throughout the coverage areas 110. Each device 115 may be stationary or mobile. In one configuration, the devices 115 may be able to communicate with different types of base stations such as, but not limited to, macro base stations, pico base stations, and femto base stations, via links 125.

Generally, mobile devices 115 monitor pilot signals from base stations 105 to determine which networks and/or base stations 105 may provide the best downlink and/or uplink channel conditions. The mobile devices 115 may then select a RAN and/or particular base station 105 for communication and register or "camp" on the network. Registration of a device on a network may also be called network attachment. Registration and/or attachment may include sending an attach request from the device to the RAN, allocating a device identifier for the registered device (e.g., Temporary Mobile Subscriber Identity (TMSI), and the like), authentication of the of the device on the network, bearer context setup in the device and network, and/or mobility management by the network.

Mobility management provides functions associated with tracking registered devices so the network can locate the subscribers for mobile terminated (MT) communications such as calls, short messaging service (SMS), and/or other services that may require MT communications. For locating mobile devices, the network may be divided into network location areas. Each network location area may be associated with a group of base stations 105. Where each base station supports multiple cells or sectors, each network location area may be composed of multiple cells or sectors from multiple base stations. Typically, each cell or sector is assigned to a single network location area. A network location area may be called a Location Area or Routing Area (e.g., GSM and UMTS networks, etc.) or a Tracking Area (e.g., LTE networks, etc.). Each network location area typically has a unique network location area identifier (e.g., Tracking Area Identities (TAI), Routing Area Identities (RAI), Location Area Identities (LAI), and/or the like).

While "camped" on a particular network or base station, mobile devices 115 may monitor network overhead messaging for the network and update network registration periodically or based on a change to device or network parameters. Network overhead messaging may include various information used for communicating with the particular network. For example, network overhead messaging may include system parameters, access parameters, neighbor lists, channel lists, etc. System parameters may include, for example, parameters related to Paging Channel (PCH) configuration, parameters related to device registration, and/or parameters to aid pilot acquisition. Access parameters may include, for example, parameters related to the configuration of the Access Channel (e.g., preamble size, maximum size, etc.) and/or control parameters used to stabilize the Access Channel. Neighbor lists may include time offset of pilots and basic configuration for neighboring access points. Channel list parameters may include frequency assignments for paging, access, and/or traffic channels. Network overhead messaging may be sent on, for example, common control channels (CCHs) or broadcast control channels (BCCHs) of the network.

Generally, mobile devices 115 update network registration periodically and/or when a the mobile device 115 detects a change to a parameter that may affect bearer context setup with the network. For example, existing mobile devices may perform explicit registration when they are turned ON and OFF, if frequency band or class changes, periodically after a specific time duration, periodically after traveling a specified distance, upon entering a new zone (e.g., network location area, etc.) of the network, and/or based on a change in various device parameters.

While the system 100 may be designed primarily wireless communications involving humans, the system 100 may support M2M devices 120 that perform various functions, capture information, and/or communicate information with limited or no human intervention. For example, M2M devices 120 may include sensors and/or meters for monitoring and/or tracking other devices, environmental conditions, etc. M2M devices 120 may be used with various applications such as, but not limited to, remote monitoring, measurement and condition recording, fleet management and asset tracking, in-field data collection, distribution, physical access control, and/or storage, etc.

M2M devices 120 may be standalone devices or, in embodiments, M2M devices 120 may be modules incorporated in other devices. For example, devices (e.g., user equipment, mobile stations, etc.) such as smart phones, cellular phones and wireless communications devices, personal digital assistants (PDAs), tablets, other handheld devices, netbooks, ultrabooks, smartbooks, notebook computers, surveillance cameras, handled medical scanning devices, home appliances, etc. may include one or more M2M device modules 120. In the ensuing description, various techniques are described as applied to communications and processing for a system including a network and one or more M2M devices. It should be understood that the described techniques may be advantageously applied to other devices such as those incorporating M2M modules and/or other wireless communication devices.

The information collected by the M2M devices 120 may be transmitted across a network that includes components of system 100 to a back-end system, such as a server. The transmission of data to/from the M2M devices 120 may be routed through the base stations 105. The base stations 105 may communicate with the M2M devices 120 on a forward link for transmitting signaling and/or information to the M2M devices 120 and a reverse link for receiving signaling and/or information from the M2M devices 120.

The behavior of the M2M devices 120 may be pre-defined. For example, the day, time, etc. to monitor an environmental, personal, or machine condition and transmit the collected information may be pre-defined for an M2M device 120. The M2M device 120 may be programmed to begin monitoring an environmental condition and collect information at a first pre-defined time period. The M2M device 120 may also be programmed to transmit the collected information at the same or a second pre-defined time period. The behavior of an M2M device 120 may be remotely programmed to the M2M device 120.

Various aspects of M2M devices 120 may pose different challenges for wireless communications networks than traditional wireless communication involving humans. For instance, the volume of M2M devices 120 may be much larger than traditional wireless devices associated with human subscribers. M2M devices 120 may also have aspects that differ from traditional wireless devices with regard to mobility and power efficiency. For example, certain M2M devices 120 may be permanently installed in a static location or have periods of time where their locations may be static, followed by periods of time of mobility. In addition, certain M2M devices 120 may be delay tolerant and may not need to transmit or receive very often or communicate high volumes of data. Certain M2M devices 120 may need to be power efficient. For example, it may be difficult or even impossible to replace batteries for some M2M devices 120 such as those used for wildlife tracking and management.

In embodiments, the system 100 is configured for improving performance in certain M2M devices 100 by suppressing explicit network registration or attachment. The described techniques may be used, for example, by M2M devices 120 that periodically or occasionally transmit event data using wireless communication networks without needing to receive periodic or on-demand communications from the network for regular operation. In some embodiments, an M2M device 120 may continue to monitor pilot channels of available wireless networks, select a particular network for communication, and monitor system information for the selected network without registering on the selected network.

The system information for the selected network may include explicit registration triggers and the M2M device 120 may suppress explicit registration based on the explicit registration triggers associated with the selected network. The system information may include access parameters for use in accessing the network. The M2M device may capture or measure information related to an event and transmit that information to the selected network as part of a network access prior to, or without performing, explicit registration on the selected network. The network access may be performed according to one or more of the access parameters. The M2M device 120 may be implicitly registered by the network as part of the network access transmitting the captured or measured event data to the selected network prior to, or without, explicit registration of the M2M device 120 with the selected network.

Figure 2:
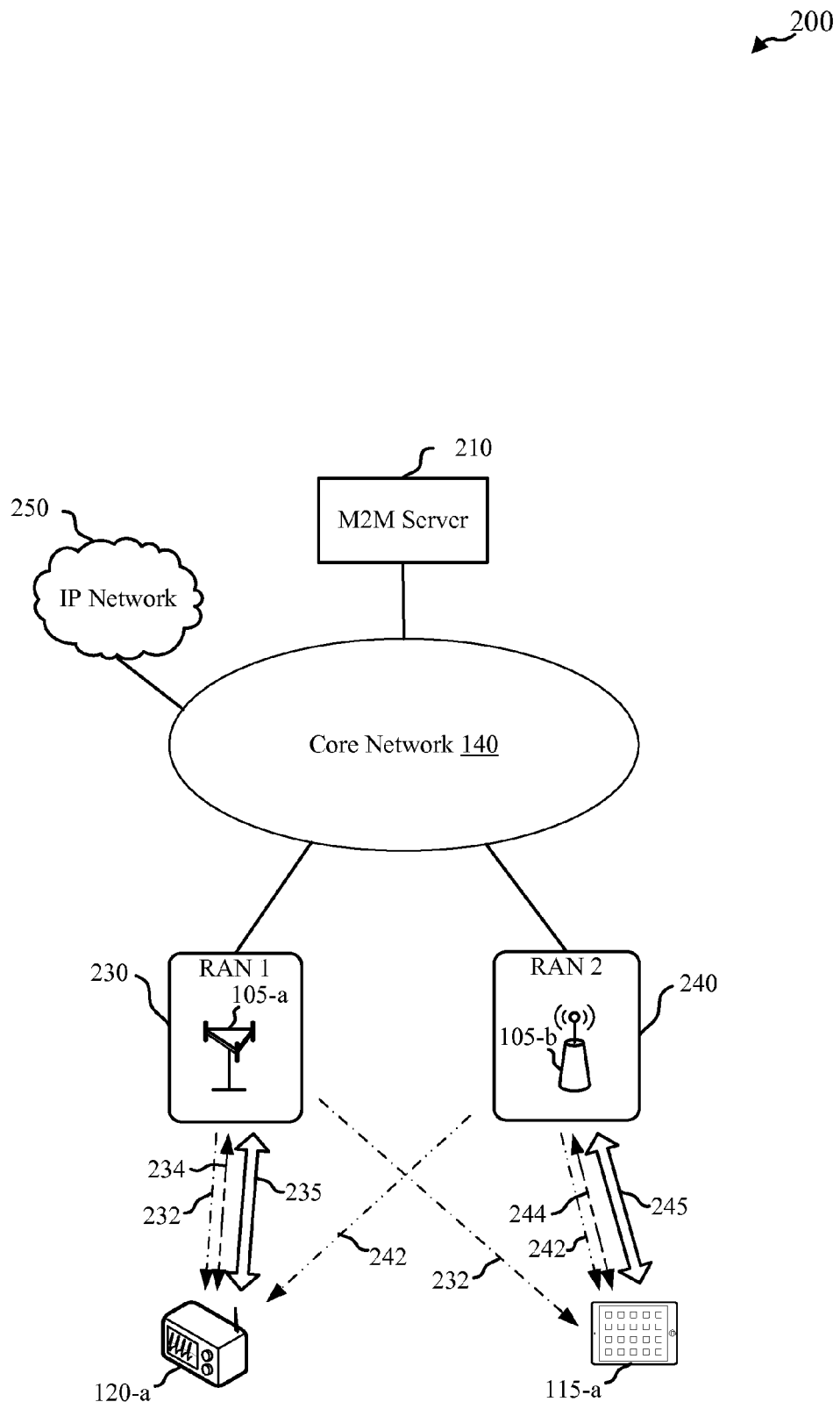
FIG. 2 illustrates an example of a wireless communication system implementing a machine type communication service in accordance with various embodiments.

FIG. 2 illustrates aspects of a wireless communication system 200 for implementing M2M communication services in accordance with various embodiments. The system 200 may include a core network 140 and one or more base stations 105. For example, the system 200 may include a first base station 105-a associated with a first network 230 and a second base station 105-b associated with a second network 240. The base stations 105-a, 105-b may be examples of the base stations illustrated in FIG. 1.

The system 200 may include one or more mobile devices 115 and one or more M2M devices 120. For ease of illustration, one mobile device 115-a and one M2M device 120-a are illustrated in FIG. 2. One skilled in the art would understand that the quantity of base stations 105, M2M devices 120, mobile devices 115, Core Networks 140, and/or RANs 230, 240 shown in FIG. 2 is for illustration purposes only and should not be construed as limiting.

Base station 105-a of network 230 and base station 105-b of network 240 may transmit pilot signals 232 and 242, respectively. Mobile device 115-a may receive pilot signals 232 and 242 and measure the effective strengths of pilot signals 232 and 242 to determine which network to select for registration. Mobile device 115-a may determine that pilot signal 242 is stronger than pilot signal 232 and camp on network 240. Mobile device 115-a may receive network overhead messaging via control channels 244 for network 240 and perform explicit registration on network 240 using control channels 244. While camped on network 240 and not actively communicating data, mobile device 115-a may perform explicit registrations to network 240 based on various registration triggers. When actively communicating, network 240 may assign traffic channel 245 for communication of information (e.g., voice data, video, images, etc.) between the base station 105-b and the mobile device 115-a. Traffic channel 245 may include downlink and uplink traffic channels for bidirectional communication.

The wireless communication system 200 may be operable to facilitate M2M communication between one or more M2M devices 120 and/or one or more base stations 105. Machine-to machine communications may include autonomous uplink communications between one or more M2M devices 120 and/or one or more base stations 105 without human intervention. Data collected by the M2M devices 120 (e.g., monitoring data, sensor data, meter data, etc.) may be transferred to the M2M server 210 on the uplink communications.

The system 200 may include M2M device 120-a that performs functions for which only periodical and/or occasional transmission of data to the network may be needed. In addition, M2M device 120-a may be able to operate without the need for commands from the network or to receive information from the network for regular operation of the M2M device 120-a. For example, M2M device 120-a may monitor environmental conditions, be used for inventory or vehicle tracking, and/or be used in wildlife tracking and/or management.

In embodiments, M2M device 120-a may measure or capture data and transmit the data to the network 230 without performing explicit registration on the network 230. In embodiments, M2M device 120-a may also monitor pilot signals 232 and 242 to select between the available networks 230 and 240. In this instance, M2M device 120-a may determine that the pilot signal 232 for network 230 is stronger than the pilot signal 242 for network 240. In some embodiments, M2M device 120-a may monitor system information for network 230 via control channels 234 without explicitly registering on network 230. The system information for network 230 may include explicit registration triggers and the M2M device 120-a may suppress explicit registration on network 230 even when one of the explicit registration triggers is detected. For example, the M2M device 120-a may suppress registrations based on one or more registration triggers such as device power up/power down, frequency/band class changes, time period-based registration, movement-based registration, zone-based registration, and/or parameter change based registration.

The system information may include access parameters for use in accessing the network 230. The M2M device may capture or measure information related to an event and transmit that information to the network 230 as part of a network access prior to, or without performing, explicit registration on the selected network. The network access may be performed over the control channels 234 and may be performed according to the access parameters. The M2M device 120-a may transmit the information to the network 230 over traffic channels 235 assigned by network 230 as part of the network access. Traffic channels may include one or more uplink and downlink channels for bidirectional communication. The M2M device 120 may be implicitly registered by the network 230 as part of the network access transmitting the captured or measured event data to the selected network prior to, or without, explicit registration of the M2M device 120-a with the network 230.

Suppressing registration may also allow M2M device 120-a to select the best network cell for transmissions without regard to the power penalty incurred in registering with a target cell. For example, M2M device 120-a may select between networks 230 or 240 based on the estimated power consumption for communication with the respective networks without accounting for the power penalty that would be incurred by performing an explicit handover (with an explicit registration on the new network).

In one example, M2M communication may include the automated exchange of data between a remote machine, such as an M2M device 120, and a back-end IT infrastructure, such as the M2M server 210, without user intervention. System 200 may also include an IP Network 250 such as the Internet. M2M server 210 may be connected to core network 140 directly or through IP network 250.

Figure 3:
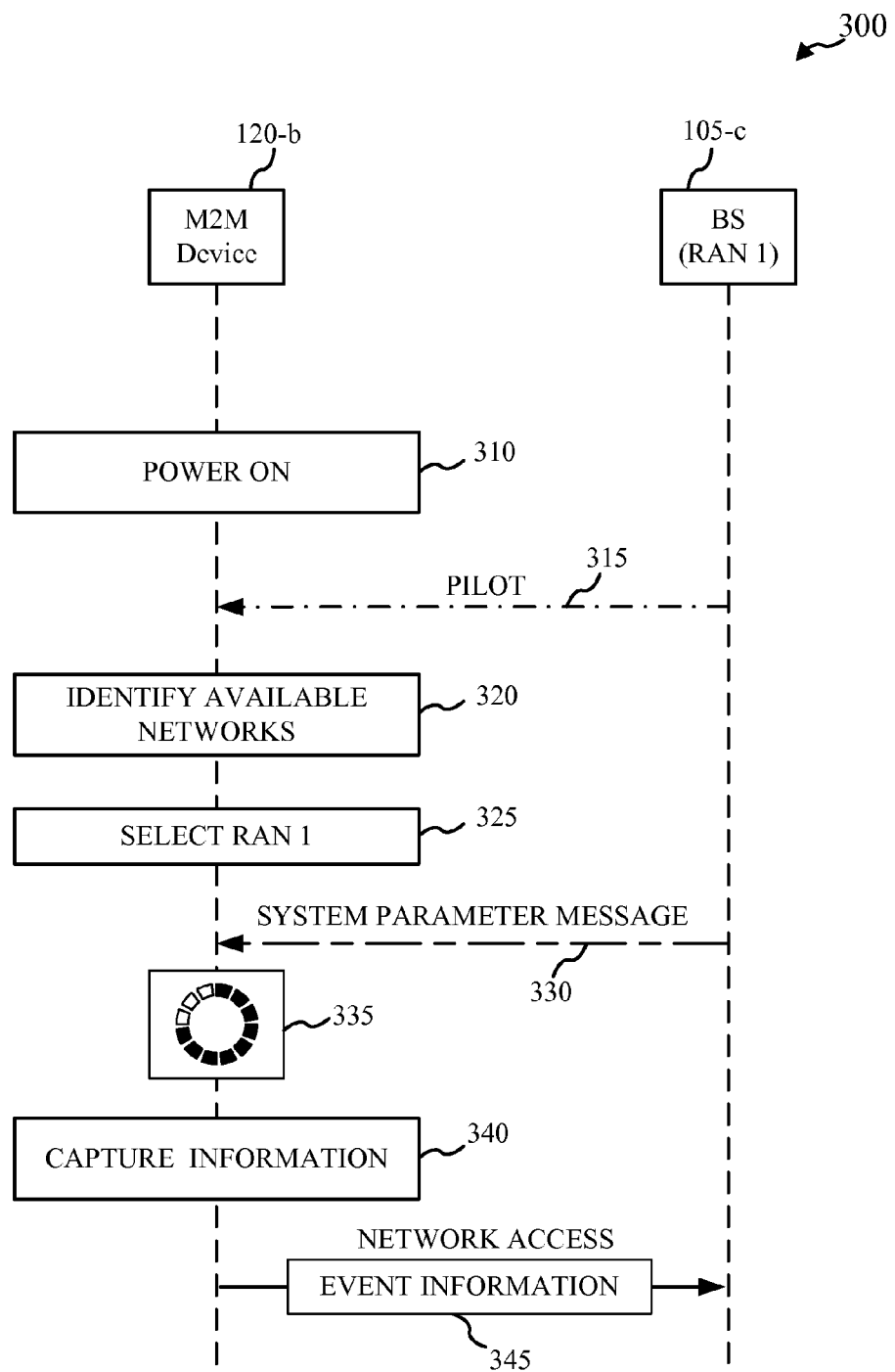
FIG. 3 illustrates a process flow for performing M2M communications between an M2M device and a base station without performing explicit network registration in accordance with various embodiments.

FIG. 3 illustrates an example process flow 300 for performing M2M communications between an M2M device 120-b and a base station 105-c without performing explicit network registrations. The process flow 300 may be an example of communications between M2M devices 120 and base stations 105 in wireless communications systems 100 and/or 200.

Process flow 300 may begin when M2M device 120-b is powered on or is activated at step 310 after a period of being in a low or zero power state (e.g., off, sleep mode, etc.). At step 320, M2M device 120-b identifies available networks. For example, M2M device 120-b may identify base station 105-c based on pilot signal 315. At step 325, M2M device 120-b may select base station 105-c for communication. For example, M2M device 120-b may determine that base station 105-c has the strongest pilot signal of all visible networks. M2M device 120-b may also select base station 105-c based on other considerations such as whether base station 105-c is a supported network and/or uses a supported Radio Access Technology.

At step 330, M2M device 120-b may receive overhead messaging from base station 105-c. For example, M2M device 120-b may receive system parameter messages from base station 105-c. While M2M device 120-b may select base station 105-c for communication, M2M device 120-b may suppress explicit registration with base station 105-c. For example, M2M device 120-b may monitor system parameter messages from base station 105-c without transmitting explicit registration messages. In this instance, base station 105-c may not be tracking or otherwise aware of M2M device 120-b.

At step 340, M2M device 120-b, or another device for which M2M device 120-b is performing or aggregating network communications, measures or captures a set of information to be relayed to an entity via a cellular network. For example, the set of information may be image data, measurement data from one or more sensors, and the like. At step 345, M2M device 120-b may transmit a network access including the set of information to the base station 105-c. Notably, M2M device 120-b may transmit the network access 245 without first performing an explicit registration of the M2M device with the base station 105-c.

By disabling explicit registrations, M2M device 120-b may conserve a substantial amount of battery power. Process flow 300 may be particularly useful in data monitoring applications such as wildlife monitoring, weather monitoring, natural calamity monitoring, water level monitoring, etc. Additionally, process flow 300 limits the number of devices that the network has to track, reducing the overhead seen by various network resources.

System parameter messages associated with the network may include explicit registration triggers that describe instances in which a device camped on the network should initiate an explicit registration with the network to update information or parameters associated with the device. For example, situations that may be associated with explicit registration on the network may include changes to device state (e.g., if the device is turned on or off, etc.), frequency band class change, periodically after specific time durations, after traveling a specified distance, network zone or tracking area changes, and/or device parameter changes. In embodiments, M2M devices 120 may suppress explicit registration for various explicit registration triggers received from a network selected by the device for communication.

Figure 4:
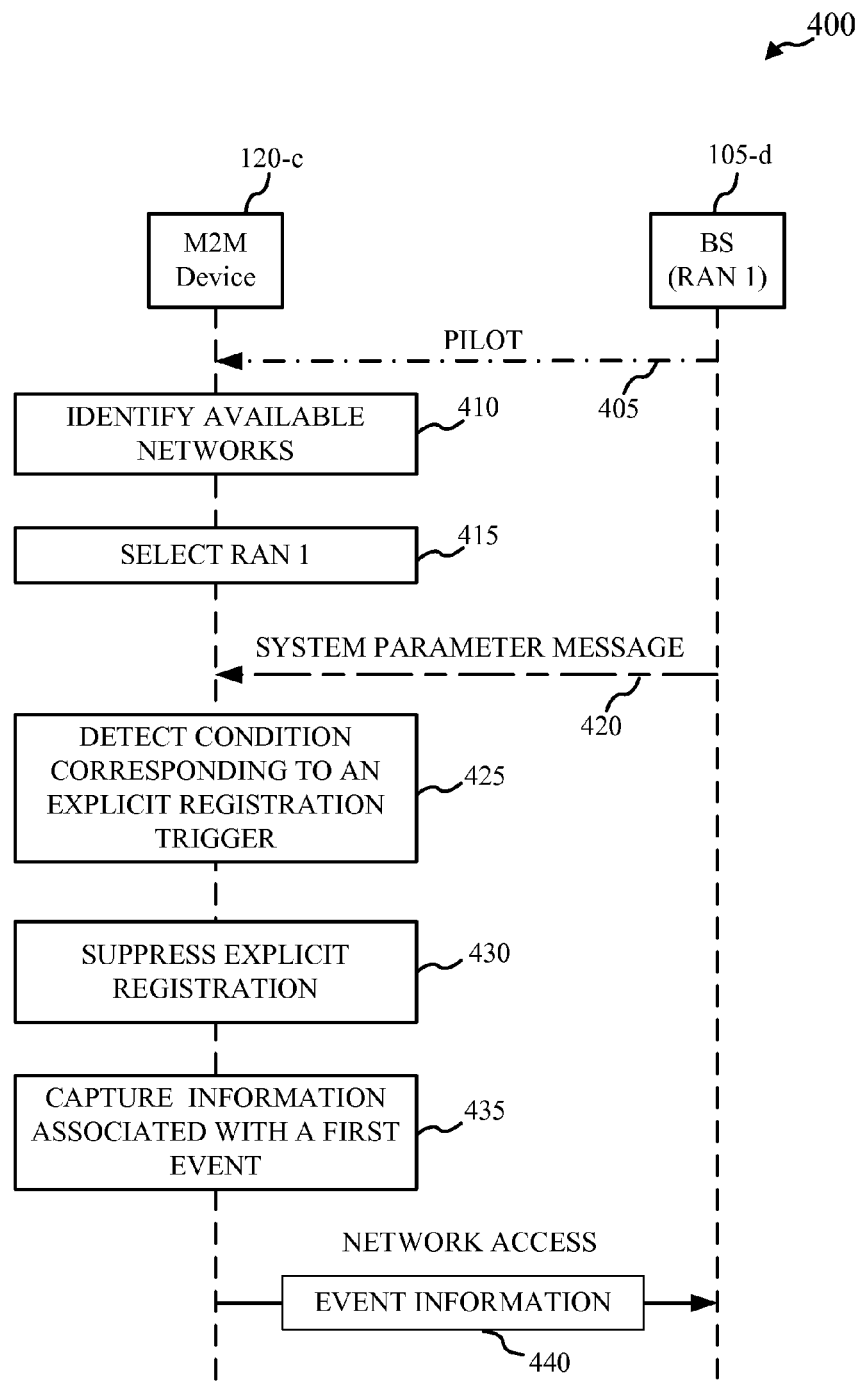
FIG. 4 illustrates another process flow for performing M2M communications between an M2M device and a base station without performing explicit network registration in accordance with various embodiments.

FIG. 4 illustrates a flow diagram 400 of an example of M2M device communications suppressing explicit network registration in accordance with various embodiments. The process flow 400 may be an example of communications between M2M devices 120 and base stations 105 in wireless communications systems 100 and/or 200.

At step 410 of process flow 400, M2M device 120-c identifies available networks. For example, M2M device 120-c may monitor pilot signals of available networks such as pilot signal 405 from base station 105-d. At step 415, M2M device 120-c may select base station 105-d for communication. For example, M2M device 120-c may determine that base station 105-d has the strongest pilot signal of all visible base stations and/or networks. M2M device 120-c may select base station 105-d based on other considerations such as whether base station 105-d is a supported network and/or supported Radio Access Technology.

At step 420, while not explicitly registered on base station 105-d, M2M device 120-c may receive overhead messaging from base station 105-d. For example, M2M device 120-c may receive system parameter messages from base station 105-d. The system parameter messages may include one or more explicit registration triggers for base station 105-d. For example, the system parameter messages may indicate that devices camped on base station 105-d should perform explicit registration based on changes to device state (e.g., if the device is turned on or off, etc.), frequency band class change, periodically after specific time durations, traveling a specified distance, network zone changes, and/or device parameter changes.

At step 425, M2M device 120-c may detect a condition corresponding to one of the received explicit registration triggers. For example, M2M device 120-c may detect that a time duration for explicit registration has expired, it has travelled a distance corresponding to a specified distance for explicit registration, it has entered a new network zone, and/or other parameters of the M2M device 120-c have changed which trigger explicit registration according to the system parameter message. At step 430, M2M device 120-c may suppress explicit registration for the explicit registration trigger detected in step 425. For example, the M2M device may determine that the specified period of time for explicit registration has expired in step 425 and suppress explicit registration in step 430.

At step 435, M2M device 120-c, or another device for which M2M device 120-c is performing or aggregating network communications, measures or captures a set of information to be relayed to an entity via a cellular network. For example, the set of information may be image data, measurement data from one or more sensors, and the like. At step 440, M2M device 120-c may transmit a network access including the set of information to the base station 105-d. Notably, M2M device 120-c may transmit the network access 440 without first performing an explicit registration of the M2M device 120-c with the base station 105-d.

Figure 5:
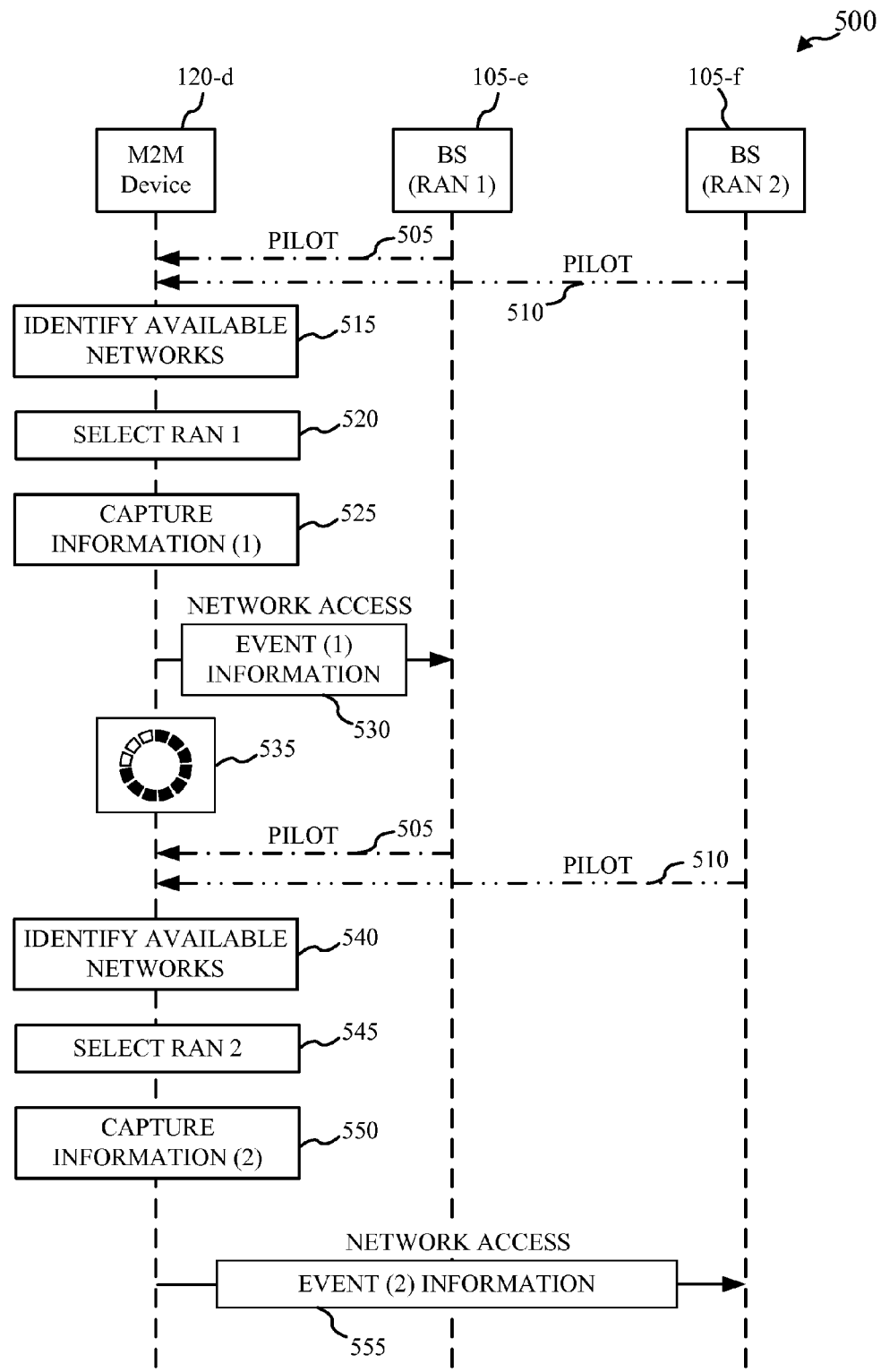
FIG. 5 illustrates yet another process flow for performing M2M communications between an M2M device and a base station without performing explicit network registration in accordance with various embodiments.

FIG. 5 illustrates a flow diagram 500 of M2M device operation without explicit network registration in accordance with various embodiments. The process flow 500 may be an example of communications between M2M devices 120 and base stations 105 in wireless communications systems 100 and/or 200.

At step 515 of process flow 500, M2M device 120-d identifies available networks. For example, M2M device 120-d may monitor pilot signals of available networks such as pilot signal 505 from base station 105-e and pilot signal 510 from base station 105-f. At step 520, M2M device 120-d may select base station 105-e for communication. For example, M2M device 120-d may determine that base station 105-e has the strongest pilot signal of all visible networks. M2M device 120-d may select base station 105-e based on other considerations such as whether base station 105-e is a supported network and/or uses a supported Radio Access Technology.

At step 525, M2M device 120-d, or another device for which M2M device 120-d is performing or aggregating network communications, measures or captures a first set of information to be relayed to an entity via a cellular network. For example, the first set of information may be image data, measurement data from one or more sensors, and the like. At step 530, M2M device 120-d may transmit a network access including the set of information to the base station 105-e. Notably, M2M device 120-d may transmit the network access 530 without first performing an explicit registration of the M2M device 120-d with the base station 105-e.

At step 540, M2M device 120-d may again identify available networks. Step 540 may occur a time period 535 after step 530. For example, M2M device 120-d may be configured to periodically measure one or more environmental conditions at a predefined measurement interval and transmit data corresponding to the measured conditions to a destination (e.g., M2M server 210, etc.) after performing the measurement. In this instance, time period 535 may correspond substantially to the time period between measurements for M2M device 120-d. M2M device 120-d may enter a low power state during time period 535 where M2M device 120-d does not monitor pilot signals or other information for available networks.

At step 540, M2M device 120-d may select base station 105-f for communication. For example, M2M device 120-d may determine that pilot signal 510 of base station 105-f is now stronger than pilot signal 505 of base station 105-e. At step 550, M2M device 120-d may measure or capture a second set of information to be relayed to an entity via a cellular network. For example, the second set of information may be image data, measurement data from one or more sensors, and the like. At step 555, M2M device 120-d may transmit a network access including the second set of information to the base station 105-f. Notably, M2M device 120-d may transmit the network access 555 without first performing an explicit registration of the M2M device 120-d with the base station 105-f.

In embodiments, M2M device 120-d may remain camped (without explicitly registering) on base station 105-e during time period 535. In this instance, during time period 535, M2M device 120-d may periodically monitor the strength of available networks (e.g., by monitoring pilot signals 505 and/ or 510, etc.), and select a network for communication while suppressing explicit registration on the selected network.

Step 540 may correspond to a point where pilot signal 510 from base station 105-f becomes stronger than pilot signal 505 from base station 105-e. As a result, M2M device 120-d may perform an implicit handover from base station 105-e to base station 105-f at step 545. The implicit handover at step 545 may include M2M device 120-d selecting base station 105-f for subsequent communications without registering on base station 105-f. M2M device 120-d may not register or otherwise inform either base station 105-e or base station 105-f of the implicit handover.

In an explicit handover, a mobile device may account for power consumption of explicit registration in determining whether to handover to a better base station. For example, while camped on a particular network, the mobile device may compare the estimated transmit power for the current network and any alternate networks. However, the mobile device may account for power required to register on an alternate network as a power penalty. Thus, the mobile device may only handover to the alternate network if the estimated transmit power for the alternate network is less than the estimated transmit power for the current network after accounting for the power penalty of registration. Therefore, mobile devices do not always perform handover to the best available pilot because the registration penalty can negate the benefits of handover, in some instances.

In embodiments, M2M device 120-d may perform the implicit handover without registering or communicating the handover to either base station 105-e or base station 105-f. Accordingly, M2M device 120-d may perform the handover without accounting for power consumed by registration. For example, M2M device 120-d may perform an implicit handover at step 545 even where the channel quality relative to base station 105-f, accounting for a registration penalty related to power consumption that would be incurred by registering the mobile device with base station 105-f, is lower than the channel quality relative to base station 105-e.

Figure 6:
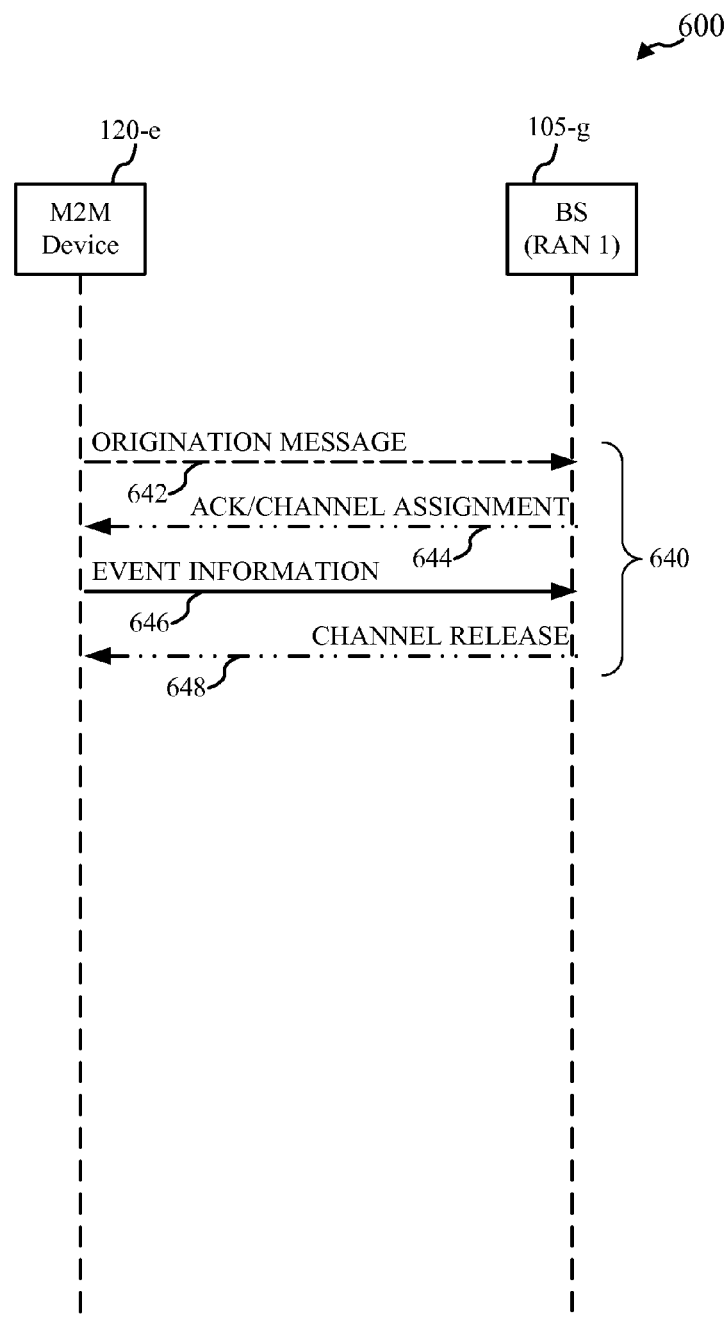
FIG. 6 illustrates a flow diagram for a network access between an M2M device and a base station without performing explicit network registration in accordance with various embodiments.

FIG. 6 illustrates a flow diagram 600 of an example network access 640 by an unregistered M2M device in accordance with various embodiments. The network access 640 may be an example of network accesses 345, 440, 530, and/or 555, in some embodiments.

In embodiments, the network access 640 includes an origination message 642 from the M2M device 120-e to the base station 105-g. For example, the origination message 642 may be sent on an access channel associated with the base station 105-g. The origination message 642 may include, for example, an access probe by the M2M device 120-e on an access channel of base station 105-g. The origination message may be performed according to system parameters of base station 105-g. For example, M2M device 120-e may, prior to sending origination message 642, monitor system parameter messages from base station 105-g without explicitly registering on base station 105-g. M2M device 120-e may use various parameters from the system parameter messages in sending the origination message 642 (e.g., access channel preamble size, etc.). The origination message 642 may also include status information, device identification information, device capability information, and/or other information related to identifying the M2M device 120-e and/or setting up communications between the M2M device 120-e and the base station 105-g. The base station 105-g may implicitly register the M2M device 120-e based on the origination message 642. For example, the base station 105-g may authenticate the M2M device 120-e on the network and/or register the location of M2M device 120-e with other network entities (e.g., mobility management entity, etc.).

The network access 640 may further include receiving an acknowledgement (ACK) message and/or a channel assignment 644 at the M2M device 120-e from the base station 105-g. The network access 640 may include a transmission 646 of the set of information by the M2M device 120-e to the base station 105-g over the assigned traffic channel. The network access may include channel release messaging 648 to release the assigned traffic channel.

In embodiments, M2M device 120-e may transmit information to the network via base station 105-e without establishing a traffic channel. For example, if M2M device 120-e captures or measures data that can be transmitted within control channel signaling, the M2M device 120-e may transmit the information in various control signaling messages such as the origination message 642.

Figure 7:
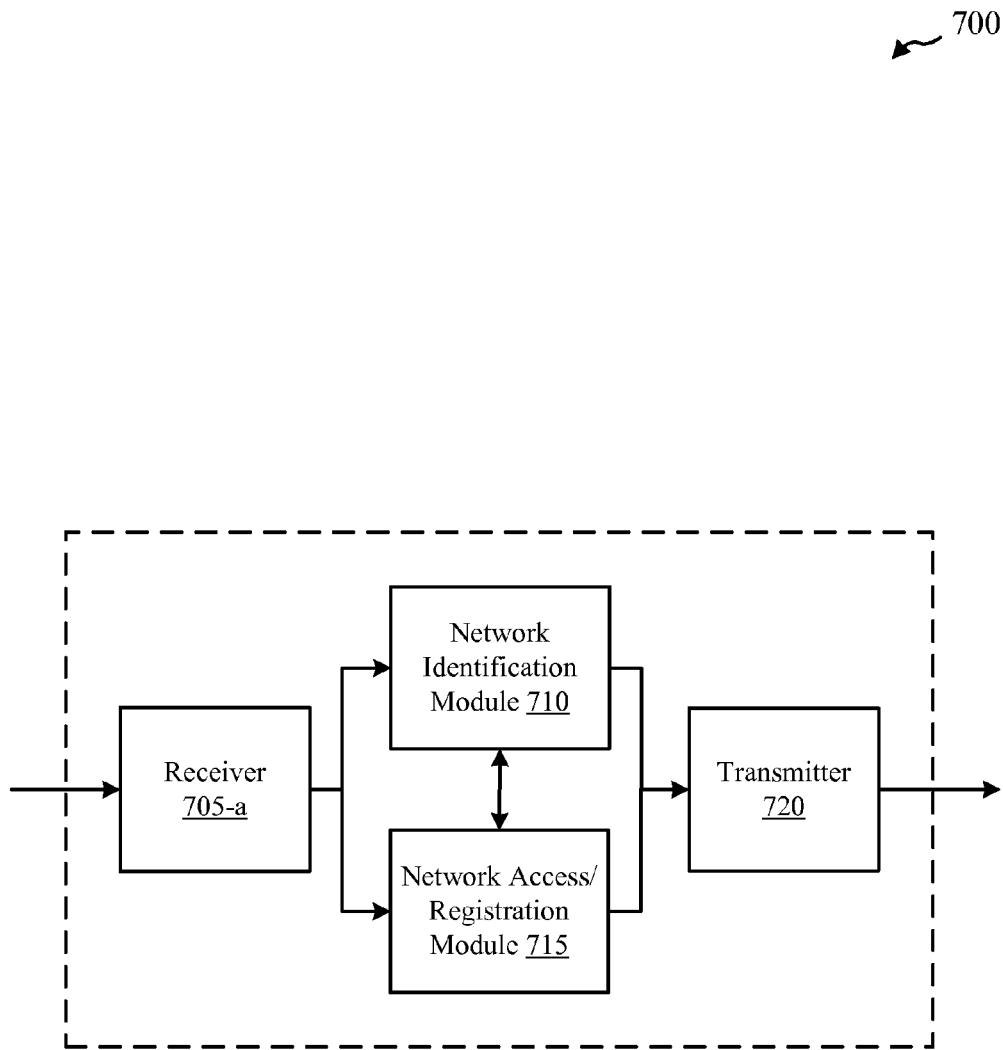
FIG. 7 is a block diagram of a device for performing M2M communications without explicit network registration in accordance with various embodiments.

Turning next to FIG. 7, a block diagram illustrates a device 700 for supporting M2M communications with a network without explicit registration in accordance with various embodiments. The device 700 may be an example of one or more aspects of M2M devices 120 described with reference to FIGS. 1, 2, 3, 4, 5, and/or 6. The device 700 may also be a processor. The device 700 may include receiver 705, network identification module 710, network access/registration module 715, and/or transmitter 720. Each of these components may be in communication with each other.

These components of the device 700 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the device 700.

The network identification module 710 may identify base stations for autonomous uplink communications from the device 700. The network access/registration module 715 may perform functions associated with disabling or suppressing explicit registration on an identified wireless network. For example, the network access/registration module 715 may suppress explicit registration for a wireless network identified by the network identification module 710. The network access/registration module 715 may transmit (e.g., via transmitter 720), a network access to the identified network without performing explicit registration on the identified network. The network access may be part of communication by the device 700 of information measured or captured by the device. For example, the device 700 may transmit information associated with a captured or measured event in a network access without having explicitly registered on the network.

The network access may be initiated by the device 700 for example, by transmitting an origination message and/or access probe on a reverse link access channel of the identified wireless network. The origination message and/or access probe may include status information of the device 700 and/or a mobile device identifier. In embodiments, the device 700 may then receive a traffic channel assignment from the wireless network and transmit the event information to the wireless network over the traffic channel. In embodiments, the device 700 may transmit the event information within the origination message and/or over a control channel instead of a dedicated traffic channel (e.g., where the amount of information is small enough to be transmitted in control messaging).

Figure 8:
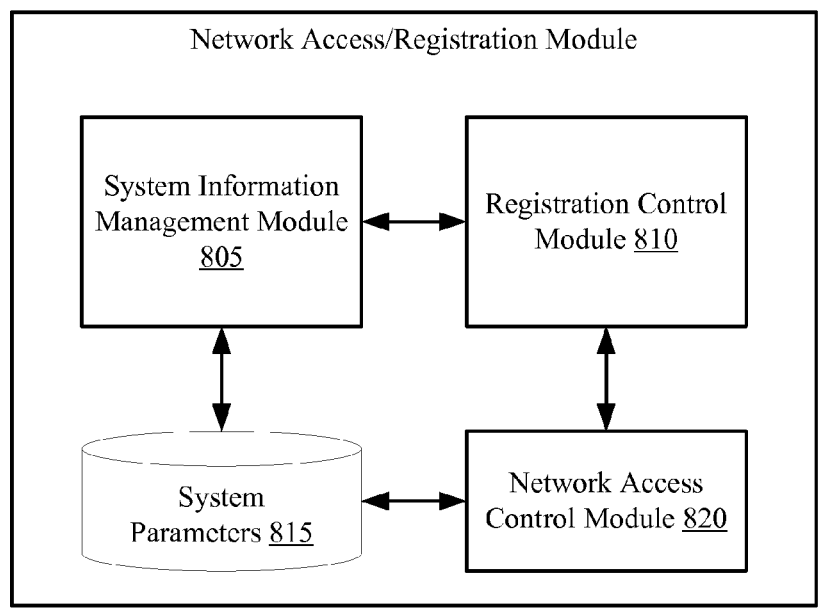
FIG. 8 is a block diagram of a network access/registration module for performing aspects of M2M communications without explicit network registration in accordance with various embodiments.

In embodiments, the device 700 may receive system information from a network identified by network identification module 710 (e.g., via receiver 705) even while network access/registration module 715 is suppressing explicit registration to the identified network. FIG. 8 illustrates an example of network access/registration module 800 for receiving, managing, and/or suppressing explicit registration based on one or more explicit registration triggers that may be present in system information received from the network, according to various embodiments. Network access/registration module 800 may be an example of network access/registration module 715 of FIG. 7. Network access/registration module 800 may include system information management module 805, registration control module 810, system parameter data store 815, and/or network access control module 820.

Network access/registration module 800 may be used for monitor system overhead messaging (e.g., system parameter messages and/or the like) for a selected network without explicitly registering on the network. The system information may include one or more explicit registration triggers. For example, the system information may include parameters indicating that devices that are "camped" on the network should perform an explicit registration with the network upon specified changes to device state (e.g., if the device is turned on or off, etc.), frequency band class changes, periodically after a specified time duration, after traveling a specified distance, upon network zone changes, and/or upon a change to specified device parameters. The system information may also include access parameters (e.g., parameters used for access probe and/or other access messages used to initiate an active connection to the wireless network). The system information may be stored in system parameter data store 815. Registration control module 810 may suppress explicit registration based on the one or more explicit registration triggers. Access control module 820 may initiate an active connection with the network (e.g., using the access parameters from system parameter data store 815) prior to explicit registration of the device on the network.

Consider a device 700 that is configured for inventory tracking using autonomous uplink communications via one or more wireless networks. The device 700 may be configured to determine the location for the associated inventory at a predefined time interval and transmit the information to an entity (e.g., M2M server 210) via a wireless network. The device 700 may select a base station 105 or network cell for transmission of the information (e.g., based on pilot signal strength, etc.) and monitor system information transmitted by the network cell. The system information may include information indicating that devices camped on the network should explicitly register to the network at a certain registration time interval and upon changing network zones. During the time period between transmissions of inventory location, the device 700 may determine that it has changed network zones. Network access/registration module 715 may suppress explicit registration based on the change in network zones.

Figure 9:
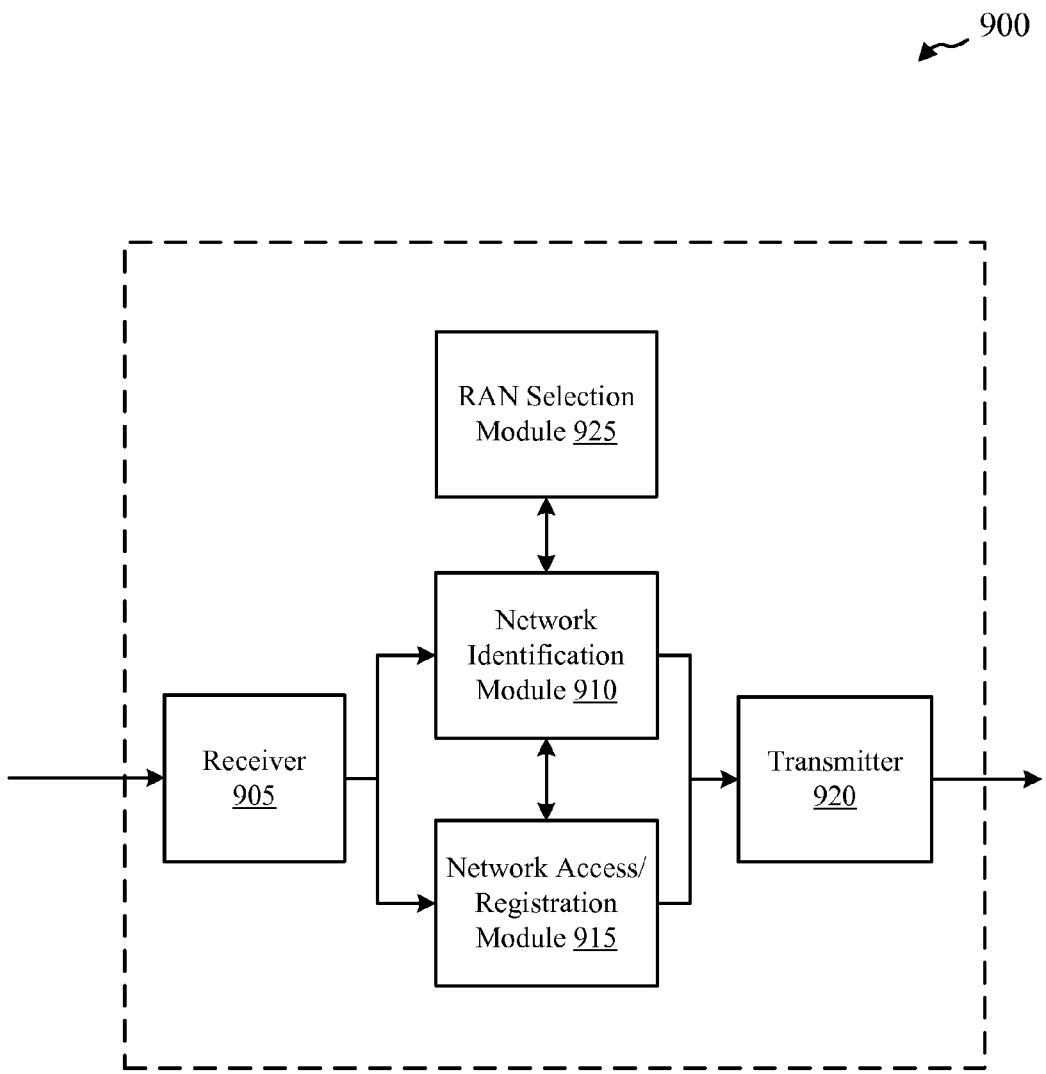
FIG. 9 is a block diagram of a device for performing M2M communications without explicit network registration in accordance with various embodiments.

Turning next to FIG. 9, a block diagram illustrates a device 900 for supporting M2M communications with a network without explicit registration in accordance with various embodiments. The device 900 may be an example of one or more aspects of M2M devices 120 described with reference to FIGS. 1, 2, 3, 4, 5, and/or 6. The device 900 may also be a processor. The device 900 may include receiver 905, network identification module 910, network access/registration module 915, RAN selection module 925, and/or transmitter 920. Each of these components may be in communication with each other.

These components of the device 900 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the device 900.

The network identification module 910 may identify base stations for autonomous uplink communications from the device 900. RAN selection module 925 may select a network cell or base station for communication based on the available networks identified by network identification module 910. For example, RAN selection module 925 may select a base station or network cell identified by network identification module 910 based on strength of pilot signals and/or other factors. The device 900 may monitor system information for the selected base station or network cell. Based on the strength of the received pilot signals or other factors, RAN selection module 925 may perform implicit handover from the selected base station or network to a new base station or network cell. In the implicit handover, RAN selection module 925 may begin to monitor system information from the new base station or network cell without informing the original or new network cells of the implicit handover.

The network access/registration module 915 may perform functions associated with disabling or suppressing explicit registration on an identified wireless network. For example, the network access/registration module 915 may suppress explicit registration for a wireless network selected by RAN selection module 925. The network access/registration module 915 may transmit (e.g., via transmitter 920), a network access to the identified network without performing explicit registration on the identified network. The network access may be part of communication by the device 900 of information measured or captured by the device. For example, the device 900 may transmit information associated with a captured or measured event in a network access without having explicitly registered on the network.

Figure 10:
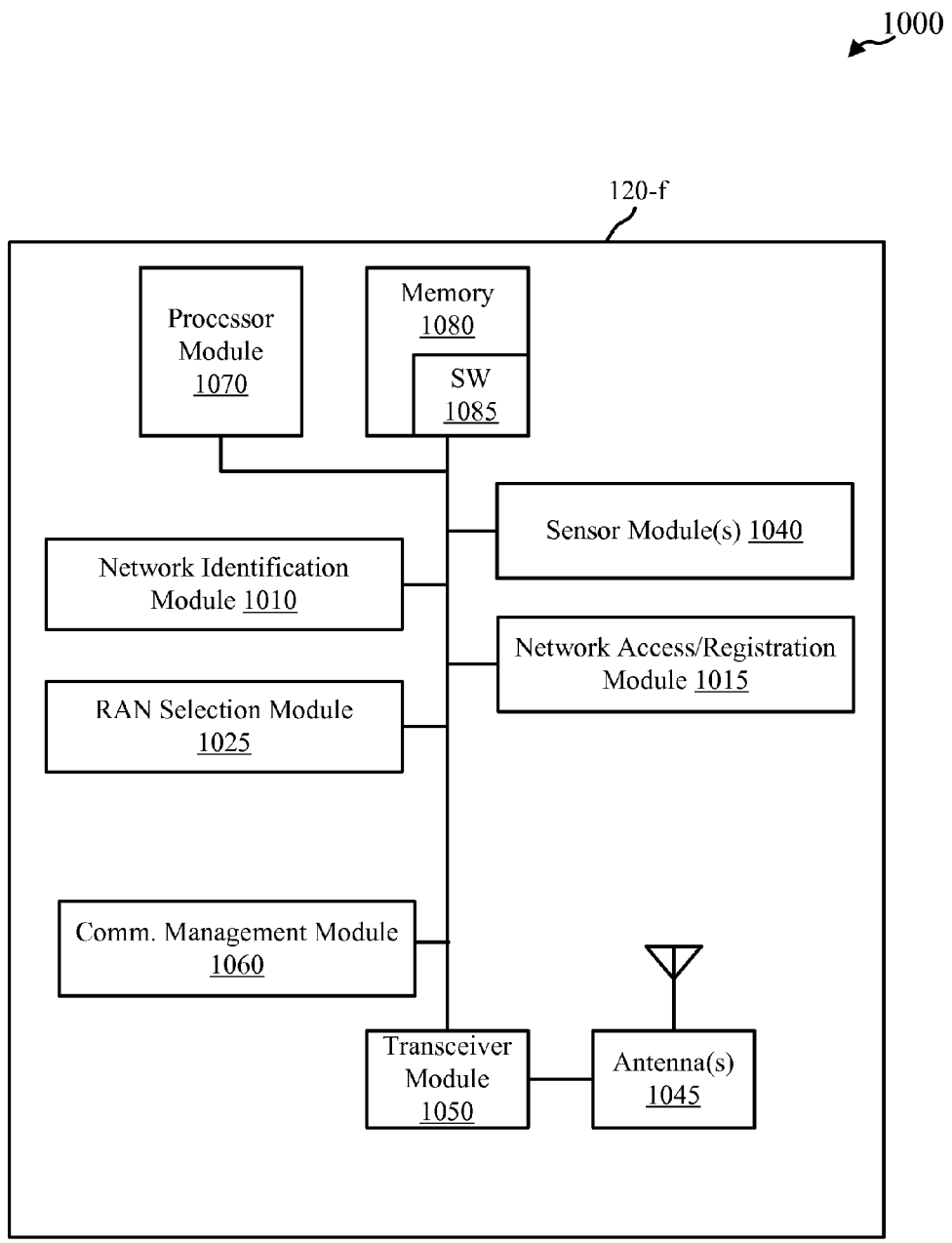
FIG. 10 shows a block diagram of a device that may be configured for performing M2M communications without explicit network registration in accordance with various embodiments.

FIG. 10 shows a block diagram 1000 of a M2M device 120-*f* configured for supporting autonomous uplink communication without explicit registration in accordance with various embodiments. The M2M device 120-*f* may have any of various configurations, such as a sensor or monitor for various M2M applications discussed above. The M2M device 120-*f* may capture or sense information via sensor module(s) 1040. The M2M device 120-*f* may have an internal power supply (not shown), such as a small battery, to facilitate mobile operation. In some embodiments, the M2M device 120-*f* may be the M2M device 120 described with reference to FIGS. 1, 2, 3, 4, 5, and/or 6. The M2M device 120-*f* may include aspects of aspects of device 700 of FIG. 7 and/or device 900 of FIG. 9. The M2M device 120-*f* may be a multi-mode mobile device. The M2M device 120-*f* may be referred to as an M2M UE or MTC device in some cases.

The M2M device 120-*f* may include antenna(s) 1045, a transceiver module 1050, memory 1080, and a processor module 1070, which each may be in communication, directly or indirectly, with each other (e.g., via one or more buses). The transceiver module 1050 may be configured to communicate bi-directionally, via the antenna(s) 1045 and/or one or more wired or wireless links, with one or more networks, as described above. For example, the transceiver module 1050 may be configured to communicate bi-directionally with base stations 105 of FIGS. 1, 2, 3, 4, 5, and/or 6. The transceiver module 1050 may include a modem configured to modulate the packets and provide the modulated packets to the antenna(s) 1045 for transmission, and to demodulate packets received from the antenna(s) 1045. While the M2M device 120-*f* may include a single antenna 1045, the M2M device 120-*f* may include multiple antennas 1045 for multiple transmission links.

The memory 1080 may include random access memory (RAM) and read-only memory (ROM). The memory 1080 may store computer-readable, computer-executable software code 1085 containing instructions that are configured to, when executed, cause the processor module 1070 to perform various functions described herein (e.g., data capture, database management, message routing, etc.). Alternatively, the software code 1085 may not be directly executable by the processor module 1070 but be configured to cause the computer (e.g., when compiled and executed) to perform functions described herein. The processor module 1070 may include an intelligent hardware device, e.g., a central processing unit (CPU) such as those made by Intel® Corporation or AMD®, an ASIC, a microcontroller, etc.

According to the architecture of FIG. 10, the M2M device 120-*f* may further include a communications management module 1060. The communications management module 1060 may manage communications with base stations 105 and/or other M2M devices 120. By way of example, the communications management module 1060 may be a component of the M2M device 120-*f* in communication with some or all of the other components of the M2M device 120-*f* via a bus. Alternatively, functionality of the communications management module 1060 may be implemented as a component of the transceiver module 1050, as a computer program product, and/or as one or more controller elements of the processor module 1070.

In embodiments, M2M device 120-*f* may be configured to measure or capture data and transmit the data to a network without performing explicit registration on the network. In embodiments, M2M device 120-*f* may monitor pilot signals of available base stations or network cells and select a base station or network cell for communication without explicitly registering with the base station or network cell. In some embodiments, while not explicitly registered on the selected base station or network cell, M2M device 120-*f* may monitor system information for the selected base station or network cell. The system information for the selected base station or network cell may include explicit registration triggers and the M2M device 120-*f* may suppress explicit registration on network even when one of the explicit registration triggers is detected. For example, the M2M device 120-*f* may suppress registrations based on one or more registration triggers such as device power up/power down, frequency/band class changes, time period-based registration, movement-based registration, zone-based registration, and/or parameter change based registration.

The system information may include access parameters for use in accessing the selected base station or network cell. The M2M device 120-*f* may capture or measure information related to an event (e.g., via sensor module(s) 1040) and transmit that information to the selected base station or network cell as part of a network access prior to, or without performing, explicit registration on the selected base station or network cell. The network access may be performed using one or more of the access parameters. The M2M device 120-*f* may be implicitly registered by the selected base station or network cell as part of the network access transmitting the captured or measured event data to the selected base station or network cell.

Suppressing registration may also allow M2M device 120-*f* to select the best network cell for transmissions without regard to the power penalty incurred in registering with a target cell. For example, M2M device 120-*f* may select between available networks based on the estimated power consumption for communication with the respective networks without accounting for the power penalty that would be incurred by performing an explicit handover (with an explicit registration on the new network).

The components for M2M device 120-*f* may be configured to implement aspects discussed above with respect to device 700 of FIG. 7 and/or device 900 of FIG. 9 and may not be repeated here for the sake of brevity. For example, the network identification module 1010 may perform similar functions as the network identification modules 710 and/or 910 of FIG. 7 and/or FIG. 9. The network access/registration module 1015 may perform similar functions as the network access/registration modules 715, 800, and/or 915 of FIGS. 7, 8, and/or 9. The RAN selection module 1025 may perform similar functions as the RAN selection module 925 of FIG. 9.

Figure 11:
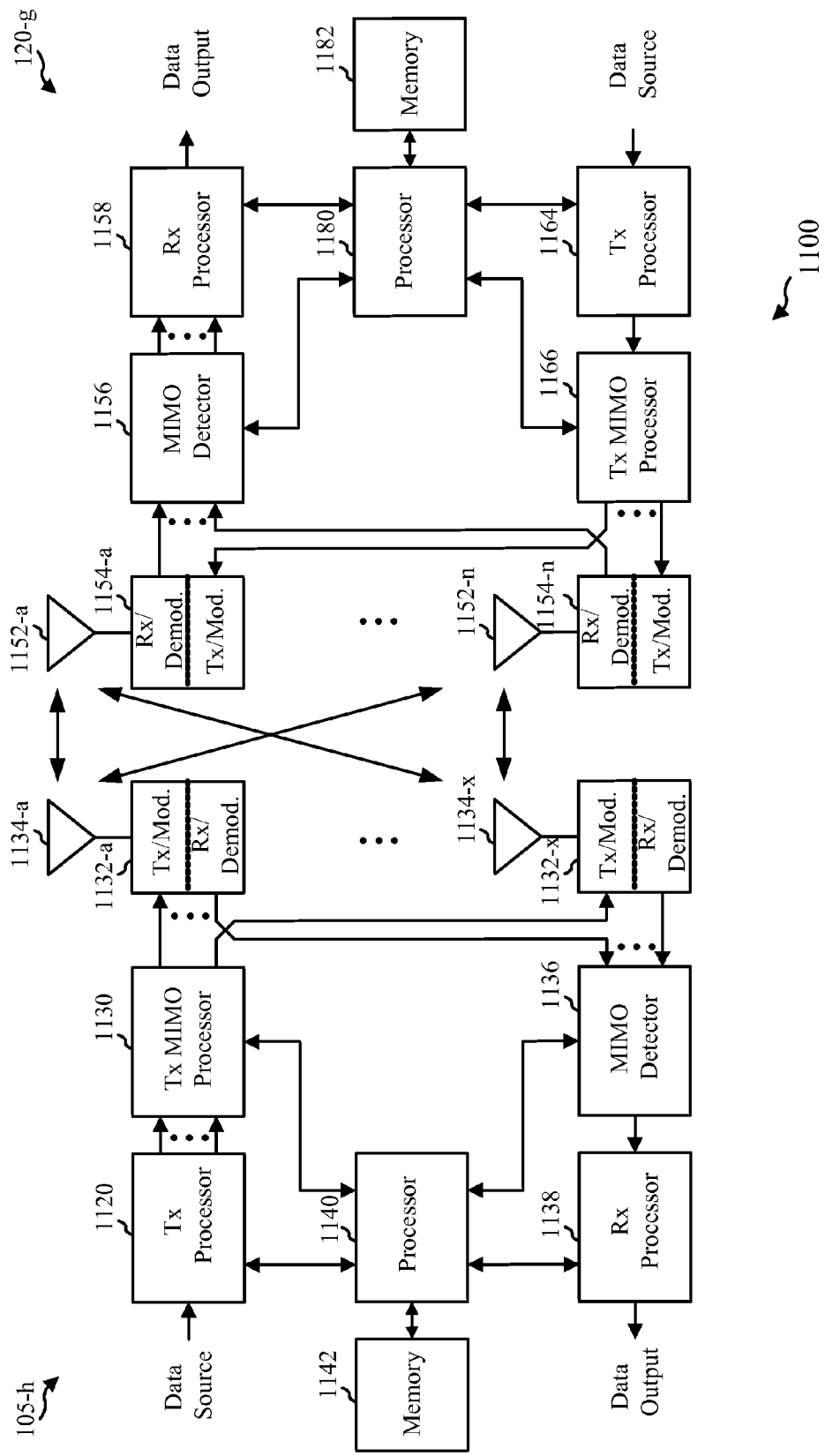
FIG. 11 is a block diagram of a wireless communications system that includes a base station and a device in accordance with various embodiments.

FIG. 11 is a block diagram of a system 1100 including a base station 105-*h* and a device 120-*g* in accordance with various embodiments. Device 120-*g* may be an M2M device or a device module that is part of an M2M device. This system 1000 may be an example of the system 100 of FIG. 1 and/or the system 200 of FIG. 2. The base station 105-*h* and/or device 120-*g* may be capable of Multiple-Input, Multiple-Output (MIMO) communications using multiple antennas. The base station 105-*h* may be equipped with antennas 1134-*a* through 1134-*x*, and the device 120-*g* may be equipped with antennas 1152-*a* through 1152-*n*.

At the base station 105-*h*, a transmit processor 1120 may receive data from a data source. The transmitter processor 1120 may process the data. The transmitter processor 1120 may also generate reference symbols, and a cell-specific reference signal. A transmit (TX) MIMO processor 1130 may perform spatial processing (e.g., precoding) on data symbols, control symbols, and/or reference symbols, if applicable, and may provide output symbol streams to the transmit modulators 1132-*a* through 1132-*x*. Each modulator 1132 may process a respective output symbol stream (e.g., for OFDM, etc.) to obtain an output sample stream. Each modulator 1132 may further process (e.g., convert to analog, amplify, filter, and upconvert) the output sample stream to obtain a downlink (DL) signal. In one example, DL signals from modulators 1132-*a* through 1132-*x* may be transmitted via the antennas 1134-*a* through 1134-*x*, respectively. The transmitter processor 1120 may receive information from a processor 1140. The processor 1140 may be configured to process paging information in accordance with the embodiments described above. In some embodiments, the processor 1140 may be implemented as part of a general processor, the transmitter processor 1120, and/or the receiver processor 1138. A memory 1142 may be coupled with the processor 1140.

In some embodiments, the processor 1140 is configured to receive communications from unregistered or unattached devices. For example, processor 1140 may be configured to receive origination messages and/or access probes from unregistered or unattached M2M devices 120 in conjunction with receiver processor 1138, modulators 1132, and antennas 1134. Processor 1140 may further be configured to receive data information through uplink communications from mobile devices 115 and/or M2M devices 120 through MIMO detector 1136 and processor 1138, demodulators 1132, and antennas 1134.

At the device 120-*g*, the device antennas 1152-*a* through 1152-*n* may receive the downlink signals from the base station 105-*h* and may provide the received signals to the demodulators 1154-*a* through 1154-*n*, respectively. Each demodulator 1154 may condition (e.g., filter, amplify, downconvert, and digitize) a respective received signal to obtain input samples. Each demodulator 1154 may further process the input samples (e.g., for OFDM, etc.) to obtain received symbols. A MIMO detector 1156 may obtain received symbols from all the demodulators 1154-*a* through 1154-*n*, perform MIMO detection on the received symbols if applicable, and provide detected symbols. A receiver processor 1158 may process (e.g., demodulate, deinterleave, and decode) the detected symbols, providing decoded data for the M2M device 120-*g* to a data output, and provide decoded control information to a processor 1180, or memory 1182.

On the uplink (UL), at the M2M device 120-*g*, a transmitter processor 1164 may receive and process data from a data source. The transmitter processor 1164 may also generate reference symbols for a reference signal. The symbols from the transmitter processor 1164 may be precoded by a transmit MIMO processor 1166 if applicable, further processed by the demodulators 1154-*a* through 1154-*n* (e.g., for SC-FDMA, etc.), and be transmitted to the base station 105-*h* in accordance with the transmission parameters received from the base station 105-*h*. The transmitter processor 1164 may be configured to process information in accordance with the embodiments described above. At the base station 105-*h*, the UL signals from the device 120-*g* may be received by the antennas 1134, processed by the demodulators 1132, detected by a MIMO detector 1136 if applicable, and further processed by a receive processor. The receive processor 1138 may provide decoded data to a data output and to the processor 1180. In some embodiments, the processor 1180 may be implemented as part of a general processor, the transmitter processor 1164, and/or the receiver processor 1158.

In some embodiments, the processor 1180 is configured to measure or capture data and transmit the data to a network without performing explicit registration on the network. In embodiments, processor 1180 may be configured to monitor pilot signals (e.g., via demodulators 1154 and antennas 1152) of available base stations or network cells and select base station 105-*h* for communication without explicitly registering with base station 105-*h*. In some embodiments, processor 1180 may be configured to monitor system information for base station 105-*h* without explicitly registering with base station 105-*h*. The system information for base station 105-*h* may include explicit registration triggers and the processor 1180 may suppress explicit registration on base station 105-*h* even when one of the explicit registration triggers is detected. The processor 1180 may be configured to detect one or more of the explicit registration triggers and suppress explicit registration based on the detected explicit registration trigger. For example, the processor 1180 may suppress registrations based on one or more registration triggers such as device power up/power down, frequency/band class changes, time period-based registration, movement-based registration, zone-based registration, and/or parameter change based registration.

The system information may include access parameters for use in accessing base station 105-*h*. The processor 1180 may capture or measure information related to an event (e.g., via one or more sensors of device 120-*g*) and transmit that information to base station 105-*h* as part of a network access prior to, or without performing, explicit registration on base station 105-*h*. The network access may be performed using one or more of the access parameters. The M2M device 120-*g* may be implicitly registered by base station 105-*h* as part of the network access transmitting the captured or measured event data.

Suppressing registration may also allow processor 1180 to select the best network cell for transmissions without regard to the power penalty incurred in registering with a target cell. For example, processor 1180 may select between available networks based on the estimated power consumption for communication with the respective networks without accounting for the power penalty that would be incurred by performing an explicit handover (with an explicit registration on the new network).

Figure 12:
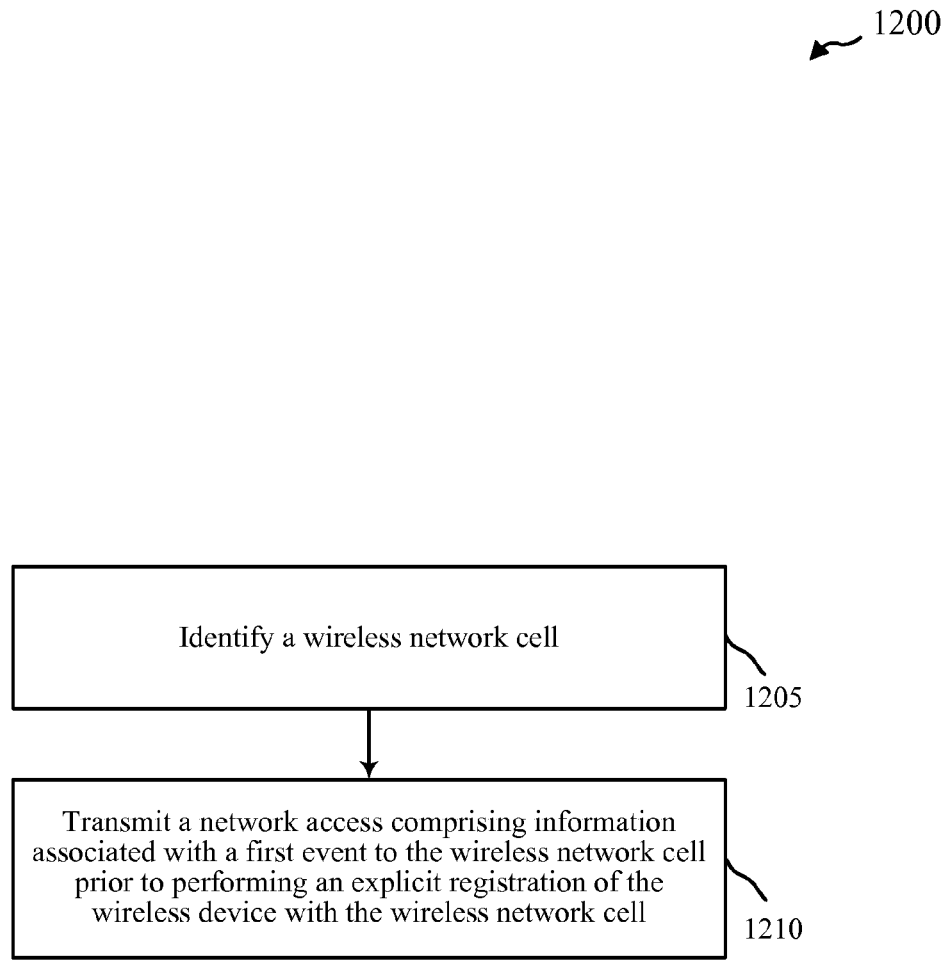
FIG. 12 is a flow chart illustrating one example of a method for performing M2M communications without explicit network registration in accordance with various embodiments.

FIG. 12 is a flow chart illustrating one example of a method 1200 for performing M2M communication between a wireless device and a network cell or base station without performing explicit network registration in accordance with various embodiments. For clarity, the method 1200 is described below with reference to communication between a wireless device such as an M2M device 120 and a wireless network cell (e.g., base station 105). In one implementation, a processor may execute one or more sets of codes to control the functional elements of the wireless device to perform the functions described below.

At block 1205 of method 1200, a wireless device may identify a first wireless network cell. For example, the wireless device may monitor pilot signals of available networks and/or base stations 105 and identify a network for communication of information measured or captured by the wireless device.

At block 1210, the wireless device may transmit a network access that includes information related to an event that is measured or captured by the wireless device to the wireless network cell identified at block 1205. The network access may be transmitted to the identified wireless network cell without first explicitly registering the wireless device with the cell.

Figure 13:
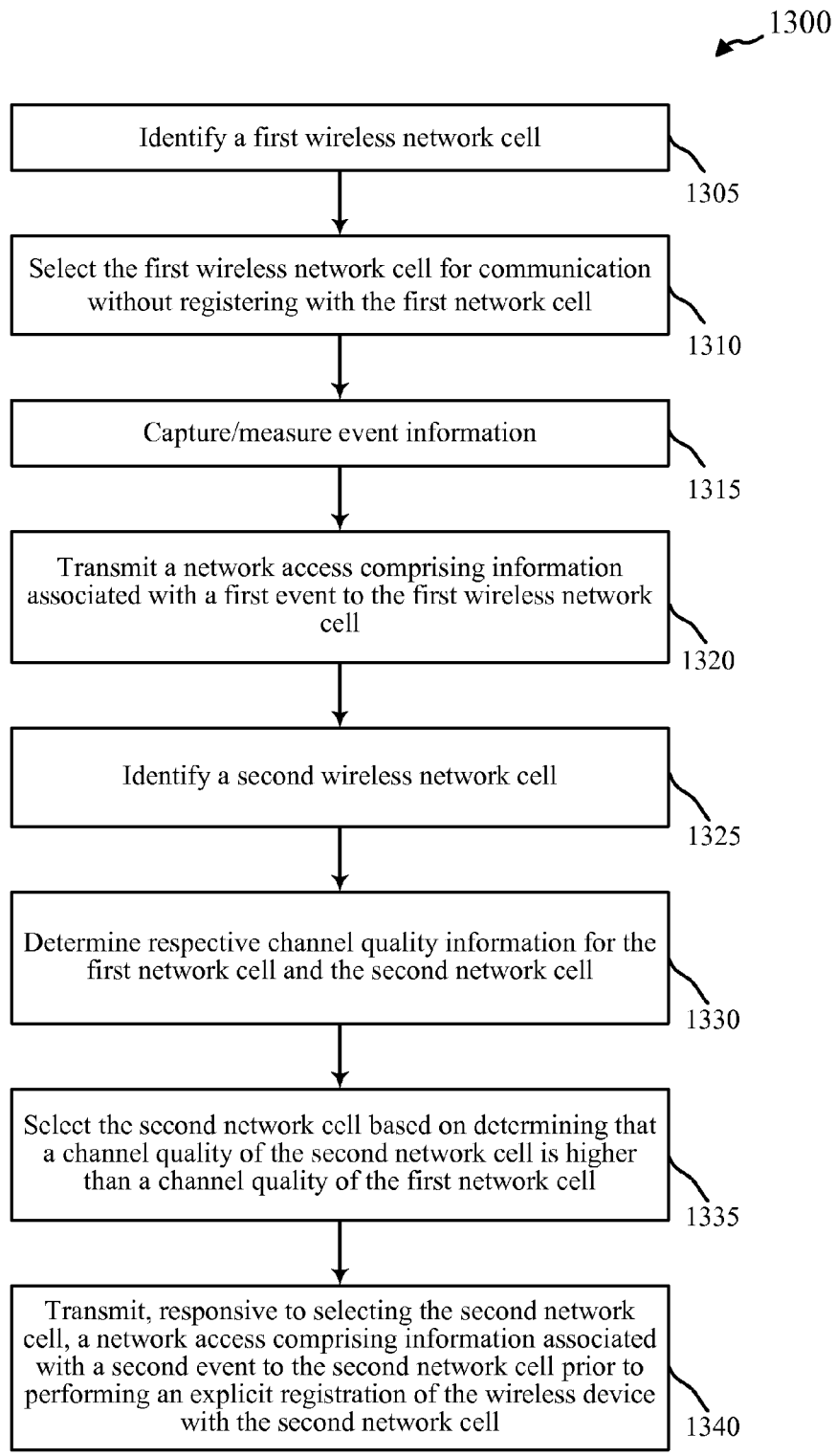
FIG. 13 is a flow chart illustrating another example of a method for performing M2M communications without explicit network registration in accordance with various embodiments.

FIG. 13 is a flow chart illustrating another example of a method 1300 for performing M2M communication between a wireless device and one or more network cells or base stations without performing explicit network registration in accordance with various embodiments. For clarity, the method 1300 is described below with reference to communication between a wireless device such as an M2M device 120 and one or more wireless network cells (e.g., base stations 105). In one implementation, a processor may execute one or more sets of codes to control the functional elements of the M2M device 120 to perform the functions described below.

At block 1305 of method 1300, a wireless device may identify a first wireless network cell. For example, the wireless device may monitor pilot signals of available networks and/or base stations 105 and identify one or more networks for communication. At block 1310, the wireless device may select a first wireless network cell for communication from among the networks identified at block 1305. Notably, the wireless device may select the first wireless network cell without explicitly registering on the first wireless network cell.

At block 1315, the wireless device may capture or measure event information. For example, the wireless device may be configured to capture or measure an environmental condition or other metric at a predetermined time interval. At block 1320, the wireless device may transmit a network access to the first wireless network cell. The wireless device may transmit the network access without prior registration to the first network cell.

At block 1325, the wireless device may identify a second wireless network cell. For example, the wireless device may receive pilot signals of the first and second wireless network cell. At block 1330, the wireless device may determine respective channel quality information for the first and second network cells. For example, the wireless device may measure the respective pilot signals of the first and second network cells.

At block 1335, the wireless device may select the second network cell based on determining that the channel quality of the second network cell is higher than the channel quality of the first network cell. For example, the wireless device may select the second network cell based on determining that the strength of the received pilot signal from the second network cell is greater than the strength of the received pilot signal from the first network cell. The wireless device may select the second network cell even where, if accounting for the registration penalty related to power consumption that would be incurred by registering the mobile device with the second network cell, the channel quality of the second network cell would be lower than the channel quality of the first network cell.

The selection of the second network cell at block 1335 may be performed as an implicit handover to the second network cell. That is, the wireless device may not inform either the first or second network cells that the wireless device has selected the second network cell for subsequent communications. At block 1340, the wireless device may transmit a network access that includes information associated with a second captured or measured event to the second network cell prior to performing explicit registration of the wireless device on the second network cell.

Figure 14:
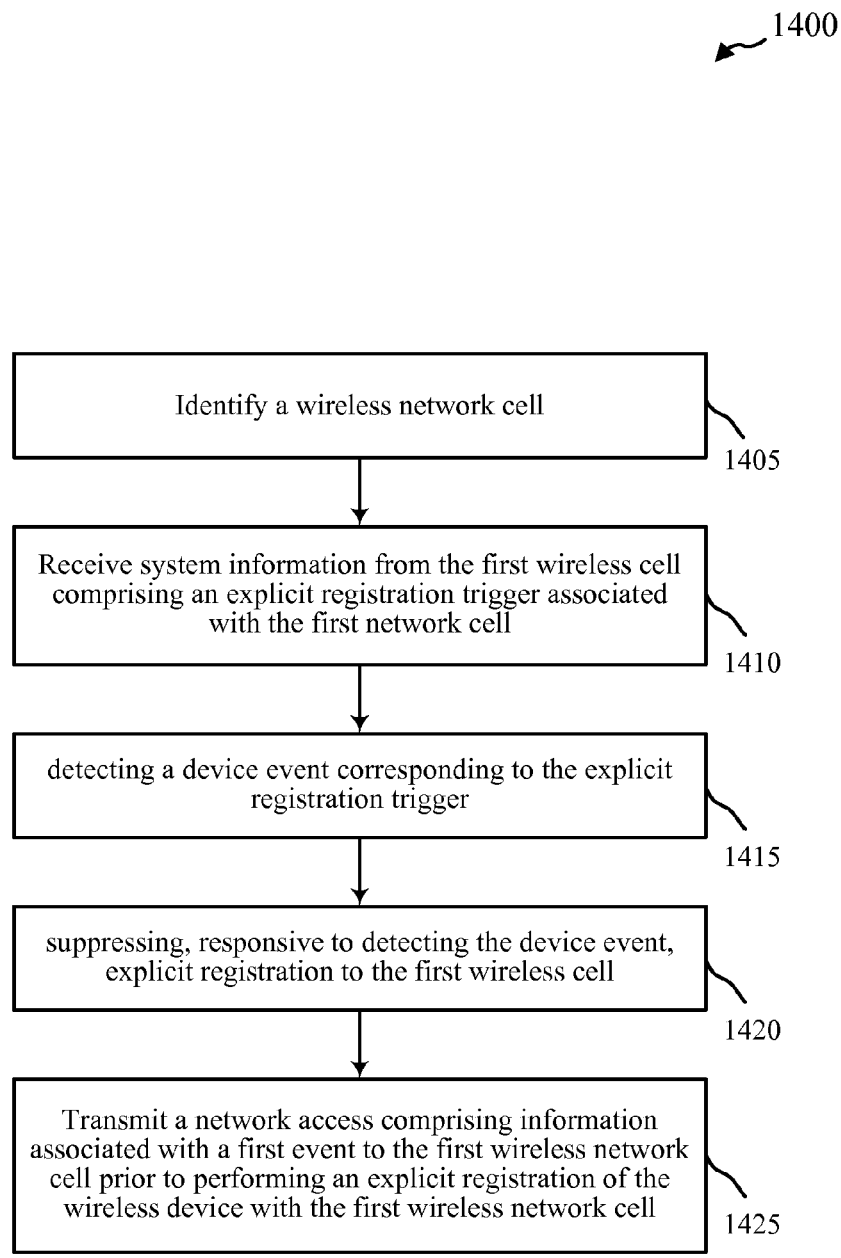
FIG. 14 is a flow chart illustrating yet another example of a method for performing M2M communications without explicit network registration in accordance with various embodiments.

FIG. 14 is a flow chart illustrating one example of a method 1400 for performing M2M communication between a wireless device and a network cell or base station without performing explicit network registration in accordance with various embodiments. For clarity, the method 1400 is described below with reference to communication between a wireless device such as an M2M device 120 and a wireless network cell (e.g., base station 105). In one implementation, a processor may execute one or more sets of codes to control the functional elements of the wireless device to perform the functions described below.

At block 1405 of method 1400, a wireless device may identify a wireless network cell. For example, the wireless device may monitor pilot signals of available networks and/or base stations 105 and identify a network for communication of information measured or captured by the wireless device. The wireless device may select the identified wireless network cell for communication without explicitly registering to the network cell.

While not explicitly registering on the selected wireless network cell, the wireless device may monitor system information from the selected wireless network cell. At block 1410, the wireless device may receive system information from the selected wireless network cell that includes one or more explicit registration triggers. For example, the system information may indicate that explicit registration on the wireless network cell should be performed upon device state changes (e.g., power up/power down, etc.), frequency/band class changes, upon expiration of a specified time period, upon movement of the device a specified distance, upon changes in network zone, and/or upon device parameter changes.

At block 1415, the wireless device may detect a device event corresponding to one or more of the explicit registration triggers. For example, the wireless device may determine that the time period for time-period based registration has expired or that the wireless device has changed network zones. At block 1420, the wireless device may suppress explicit registration even though the explicit registration trigger has been detected.

At block 1425, the wireless device may transmit a network access that includes information related to an event that is measured or captured by the wireless device to the wireless network cell identified at block 1405. The network access may be transmitted to the identified wireless network cell without first explicitly registering the wireless device with the cell.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

We claim:

1. A method for wireless communication, comprising:
identifying, by a wireless communications device configured for autonomous uplink communication, a first wireless network cell;
transmitting a network access comprising information associated with a first event to the first wireless network cell prior to performing an explicit registration of the wireless communications device with the first wireless network cell;
identifying a second wireless network cell;
determining respective channel quality information for the first wireless network cell and the second wireless network cell;
selecting the second wireless network cell based on determining that a channel quality of the second wireless network cell is higher than a channel quality of the first wireless network cell; and
transmitting a network access comprising information associated with a second event to the second wireless network cell prior to performing an explicit registration of the wireless communications device with the second wireless network cell.

2. The method of claim 1, wherein the channel quality of the second wireless network cell, accounting for a registration penalty related to power consumption that would be incurred by registering the wireless communications device with the second wireless network cell, is lower than the channel quality of the first wireless network cell.

3. The method of claim 1, wherein the first wireless network cell comprises a first base station and the second wireless network cell comprises a second base station.

4. The method of claim 1, wherein the first wireless network cell comprises a first sector of a first wireless communications network and the second wireless network cell comprises a second sector of a second wireless communications network.

5. The method of claim 4, wherein the first wireless communications network uses a first radio access technology and the second wireless communications network uses a second radio access technology.

6. A method for wireless communication, comprising:
identifying, by a wireless communications device configured for autonomous uplink communication, a first wireless network cell; and
transmitting a network access comprising information associated with a first event to the first wireless network cell prior to performing an explicit registration of the wireless communications device with the first wireless network cell;
wherein transmitting the network access further comprises:
transmitting an origination message to the first wireless network cell;
receiving a traffic channel assignment from the first wireless network cell; and
transmitting the event information to the first wireless network cell via the traffic channel.

7. The method of claim 6, wherein the origination message comprises a device identifier for the wireless communications device.

8. The method of claim 6, wherein the origination message is transmitted via a reverse link access channel of the first wireless network cell.

9. A method for wireless communication, comprising:
identifying, by a wireless communications device configured for autonomous uplink communication, a first wireless network cell;
transmitting a network access comprising information associated with a first event to the first wireless network cell prior to performing an explicit registration of the wireless communications device with the first wireless network cell;
receiving system information from the first wireless network cell comprising an explicit registration trigger associated with the first wireless network cell;
detecting a device event corresponding to the explicit registration trigger; and
suppressing, responsive to detecting the device event, explicit registration to the first wireless network cell.

10. The method of claim 9, wherein the explicit registration trigger comprises one or more of a frequency class change trigger, a time-period trigger, a movement-based trigger, a zone-based trigger, or a parameter change based trigger.

11. A wireless communications device configured for autonomous uplink communication, the wireless communications device comprising:
means for identifying a first wireless network cell;
means for transmitting a network access comprising information associated with a first event to the first wireless network cell prior to performing an explicit registration of the wireless communications device with the first wireless network cell;
means for identifying a second wireless network cell;
means for determining respective channel quality information for the first wireless network cell and the second wireless network cell;
means for selecting the second wireless network cell based on determining that a channel quality of the second wireless network cell is higher than a channel quality of the first wireless network cell; and
means for transmitting a network access comprising information associated with a second event to the second wireless network cell prior to performing an explicit registration of the wireless communications device with the second wireless network cell.

12. The wireless communications device of claim 11, wherein the channel quality of the second wireless network cell, accounting for a registration penalty related to power consumption that would be incurred by registering the wireless communications device with the second wireless network cell, is lower than the channel quality of the first wireless network cell.

13. The wireless communications device of claim 11, wherein the first wireless network cell comprises a first base station and the second wireless network cell comprises a second base station.

14. The wireless communications device of claim 11, wherein the first wireless network cell comprises a first sector of a first wireless communications network and the second wireless network cell comprises a second sector of a second wireless communications network.

15. The wireless device of claim 14, wherein the first wireless communications network uses a first radio access technology and the second wireless communications network uses a second radio access technology.

16. A wireless communications device configured for autonomous uplink communication, the wireless communications device comprising:
means for identifying a first wireless network cell; and
means for transmitting a network access comprising information associated with a first event to the first wireless network cell prior to performing an explicit registration of the wireless communications device with the first wireless network cell;
wherein the means for transmitting the network access further comprises:
means for transmitting an origination message to the first wireless network cell;
means for receiving a traffic channel assignment from the first wireless network cell;
and
means for transmitting the event information to the first wireless network cell via the traffic channel.

17. The wireless communications device of claim 16, wherein the origination message comprises a device identifier for the wireless communications device.

18. The wireless communications device of claim 16, wherein the origination message is transmitted via a reverse link access channel of the first wireless network cell.

19. A wireless communications device configured for autonomous uplink communication, the wireless communications device comprising:
means for identifying a first wireless network cell;
means for transmitting a network access comprising information associated with a first event to the first wireless network cell prior to performing an explicit registration of the wireless communications device with the first wireless network cell;

means for receiving system information from the first wireless network cell comprising an explicit registration trigger associated with the first wireless network cell;

means for detecting a device event corresponding to the explicit registration trigger; and means for suppressing, responsive to detecting the device event, explicit registration to the first wireless network cell.

20. The wireless communications device of claim 19, wherein the explicit registration trigger comprises one or more of a frequency class change trigger, a time-period trigger, a movement-based trigger, a zone-based trigger, or a parameter change based trigger.

21. A computer program product for reducing power consumption in a wireless communications device configured for autonomous uplink communication, comprising:
a non-transitory computer-readable medium comprising:
code for identifying a first wireless network cell;
code for transmitting a network access comprising information associated with a first event to the first wireless network cell prior to performing an explicit registration of the wireless communications device with the first wireless network cell;
code for identifying a second wireless network cell;
code for determining respective channel quality information for the first wireless network cell and the second wireless network cell;
code for selecting the second wireless network cell based on determining that a channel quality of the second wireless network cell is higher than a channel quality of the first wireless network cell; and
code for transmitting a network access comprising information associated with a second event to the second wireless network cell prior to performing an explicit registration of the wireless communications device with the second wireless network cell.

22. The computer program product of claim 21, wherein the channel quality of the second wireless network cell, accounting for a registration penalty related to power consumption that would be incurred by registering the wireless communications device with the second wireless network cell, is lower than the channel quality of the first wireless network cell.

23. The computer program product of claim 21, wherein the first wireless network cell comprises a first base station and the second wireless network cell comprises a second base station.

24. The computer program product of claim 21, wherein the first wireless network cell comprises a first sector of a first wireless communications network and the second wireless network cell comprises a second sector of a second wireless communications network.

25. The computer program product of claim 24, wherein the first wireless communications network uses a first radio access technology and the second wireless communications network uses a second radio access technology.

26. A computer program product for reducing power consumption in a wireless communications device configured for autonomous uplink communication, comprising:
a non-transitory computer-readable medium comprising:
code for identifying a first wireless network cell; and
code for transmitting a network access comprising information associated with a first event to the first wireless network cell prior to performing an explicit registration of the wireless communications device with the first wireless network cell;
wherein the code for transmitting the network access further comprises:
code for transmitting an origination message to the first wireless network cell;
code for receiving a traffic channel assignment from the first wireless network cell; and
code for transmitting the event information to the first wireless network cell via the traffic channel.

27. The computer program product of claim 26, wherein the origination message comprises a device identifier for the wireless communications device.

28. The computer program product of claim 26, wherein the origination message is transmitted via a reverse link access channel of the first wireless network cell.

29. A computer program product for reducing power consumption in a wireless communications device configured for autonomous uplink communication, comprising:
a non-transitory computer-readable medium comprising:
code for identifying a first wireless network cell;
code for transmitting a network access comprising information associated with a first event to the first wireless network cell prior to performing an explicit registration of the wireless communications device with the first wireless network cell;
code for receiving system information from the first wireless network cell comprising an explicit registration trigger associated with the first wireless network cell;
code for detecting a device event corresponding to the explicit registration trigger; and
code for suppressing, responsive to detecting the device event, explicit registration to the first wireless network cell.

30. The computer program product of claim 29, wherein the explicit registration trigger comprises one or more of a frequency class change trigger, a time-period trigger, a movement-based trigger, a zone-based trigger, or a parameter change based trigger.

31. A wireless communications device configured for autonomous uplink communication, the wireless communications device comprising:
at least one processor configured to
identify a first wireless network cell;
transmit a network access comprising information associated with a first event to the first wireless network cell prior to performing an explicit registration of the wireless communications device with the first wireless network cell;
identify a second wireless network cell;
determine respective channel quality information for the first wireless network cell and the second wireless network cell;
select the second wireless network cell based on determining that a channel quality of the second wireless network cell is higher than a channel quality of the first wireless network cell; and
transmit, responsive to selecting the second wireless network cell, a network access comprising information associated with a second event to the second wireless network cell prior to performing an explicit registration of the wireless communications device with the second wireless network cell.

32. The wireless communications device of claim 31, wherein the channel quality of the second wireless network cell, accounting for a registration penalty related to power consumption that would be incurred by registering the wireless communications device with the second wireless network cell, is lower than the channel quality of the first wireless network cell.

33. The wireless communications device of claim 31, wherein the first wireless network cell comprises a first base station and the second wireless network cell comprises a second base station.

34. The wireless communications device of claim 31, wherein the first wireless network cell comprises a first sector of a first wireless communications network and the second wireless network cell comprises a second sector of a second wireless communications network.

35. The wireless communications device of claim 31, wherein the first wireless communications network uses a first radio access technology and the second wireless communications network uses a second radio access technology.

36. A wireless communications device configured for autonomous uplink communication, the wireless communications device comprising:
 at least one processor configured to
  identify a first wireless network cell;
  transmit a network access comprising information associated with a first event to the first wireless network cell prior to performing an explicit registration of the wireless communications device with the first wireless network cell;
  transmit an origination message to the first wireless network cell;
  receive a traffic channel assignment from the first wireless network cell; and
  transmit the event information to the first wireless network cell via the traffic channel.

37. The wireless communications device of claim 36, wherein the origination message comprises a device identifier for the wireless communications device.

38. The wireless communications device of claim 36, wherein the origination message is transmitted via a reverse link access channel of the first wireless network cell.

39. A wireless communications device configured for autonomous uplink communication, the wireless communications device comprising:
 at least one processor configured to
  identify a first wireless network cell;
  transmit a network access comprising information associated with a first event to the first wireless network cell prior to performing an explicit registration of the wireless communications device with the first wireless network cell;
  receive system information from the first wireless network cell comprising an explicit registration trigger associated with the first wireless network cell;
  detect a device event corresponding to the explicit registration trigger; and
  suppress, responsive to detecting the device event, explicit registration to the first wireless network cell.

40. The wireless communications device of claim 39, wherein the explicit registration trigger comprises one or more of a frequency class change trigger, a time-period trigger, a movement-based trigger, a zone-based trigger, or a parameter change based trigger.

* * * * *